United States Patent
Kobayashi et al.

(10) Patent No.: US 11,413,531 B2
(45) Date of Patent: Aug. 16, 2022

(54) GAME CONSOLE APPLICATION WITH ACTION CARD STRAND

(71) Applicant: SONY INTERACTIVE ENTERTAINMENT INC., Tokyo (JP)

(72) Inventors: Satoshi Kobayashi, San Mateo, CA (US); Katsuya Hyodo, San Mateo, CA (US); Toru Yamamoto, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 233 days.

(21) Appl. No.: 16/808,197

(22) Filed: Mar. 3, 2020

(65) Prior Publication Data
US 2021/0275919 A1    Sep. 9, 2021

(51) Int. Cl.
| | |
|---|---|
| A63F 13/533 | (2014.01) |
| A63F 13/235 | (2014.01) |
| A63F 13/79 | (2014.01) |
| G06F 16/955 | (2019.01) |
| G06F 3/04817 | (2022.01) |

(Continued)

(52) U.S. Cl.
CPC .......... *A63F 13/533* (2014.09); *A63F 13/235* (2014.09); *A63F 13/79* (2014.09); *G06F 3/0482* (2013.01); *G06F 3/04817* (2013.01); *G06F 3/04842* (2013.01); *G06F 16/955* (2019.01);

(Continued)

(58) Field of Classification Search
CPC .. A63F 13/533; G06F 3/0482; G06F 3/04842; G06F 9/451
See application file for complete search history.

(56) References Cited

U.S. PATENT DOCUMENTS

| | | | |
|---|---|---|---|
| 6,976,028 B2 | 12/2005 | Fenton et al. | |
| 9,003,331 B1* | 4/2015 | Anderson | G06F 3/0482 |
| | | | 715/825 |

(Continued)

FOREIGN PATENT DOCUMENTS

| | | |
|---|---|---|
| WO | 2014197340 | 12/2014 |
| WO | 2015066658 | 5/2015 |
| WO | 2019112631 | 6/2019 |

OTHER PUBLICATIONS

PCT/US2021/019408 , "International Search Report and Written Opinion", dated Jun. 1, 2021, 15 pages.

(Continued)

*Primary Examiner* — James S. McClellan
(74) *Attorney, Agent, or Firm* — Kilpatrick Townsend & Stockton LLP

(57) ABSTRACT

A computer system and method for presenting windows in a dynamic menu are provided. The dynamic menu presents windows corresponding to an active application according to a first order, whereby windows are arranged based on recent interaction. The dynamic menu also presents windows corresponding to one or more inactive applications according to a second order, whereby windows are arranged based on relevance to a user of the computer system. The windows are presented in a first presentation state, and are expanded to a second presentation state or a third presentation state in response to user interaction. The third presentation state is reached via the second presentation state, thereby reducing latency and complexity of menu navigation.

22 Claims, 17 Drawing Sheets

(51) Int. Cl.
*G06F 3/0482* (2013.01)
*G06F 3/04842* (2022.01)

(52) U.S. Cl.
CPC . *A63F 2300/308* (2013.01); *A63F 2300/5546* (2013.01)

(56) References Cited

U.S. PATENT DOCUMENTS

| | | | |
|---|---|---|---|
| 9,412,236 B2* | 8/2016 | Earley | G07F 17/3272 |
| 9,731,207 B2 | 8/2017 | Guthridge et al. | |
| 9,761,035 B1 | 9/2017 | Flores | |
| 10,290,133 B2 | 5/2019 | Straub | |
| 10,460,023 B1 | 10/2019 | Shriver | |
| 11,169,665 B2 | 11/2021 | Hunter et al. | |
| 11,185,758 B2 | 11/2021 | Hyodo et al. | |
| 2006/0286534 A1 | 12/2006 | Tillis et al. | |
| 2007/0050733 A1* | 3/2007 | Lee | G06F 3/0482 715/825 |
| 2007/0094698 A1 | 4/2007 | Bountour et al. | |
| 2008/0109472 A1 | 5/2008 | Underwood et al. | |
| 2009/0019349 A1 | 1/2009 | Lee | |
| 2009/0031215 A1 | 1/2009 | Collier, II et al. | |
| 2009/0037821 A1 | 2/2009 | O'Neal et al. | |
| 2009/0046584 A1 | 2/2009 | Garcia et al. | |
| 2011/0196752 A1 | 8/2011 | Paulik et al. | |
| 2012/0079418 A1 | 3/2012 | Lindsay et al. | |
| 2012/0089933 A1 | 4/2012 | Garand et al. | |
| 2014/0019847 A1 | 1/2014 | Osmak | |
| 2014/0089826 A1 | 3/2014 | Boyd | |
| 2014/0195921 A1 | 7/2014 | Grosz et al. | |
| 2014/0229821 A1 | 8/2014 | Abrahami | |
| 2015/0120744 A1 | 4/2015 | Horn | |
| 2015/0234545 A1* | 8/2015 | Churchill | H04N 5/44591 715/767 |
| 2016/0103601 A1 | 4/2016 | Steinf et al. | |
| 2017/0262158 A1* | 9/2017 | Webb | G06F 3/04847 |
| 2017/0300459 A1 | 10/2017 | Luo et al. | |
| 2017/0308518 A1 | 10/2017 | Sjolander et al. | |
| 2017/0329500 A1 | 11/2017 | Grammatikakis et al. | |
| 2018/0295421 A1 | 10/2018 | Lim et al. | |
| 2018/0300020 A1 | 10/2018 | Dyar et al. | |
| 2019/0050378 A1 | 2/2019 | Novak et al. | |
| 2019/0050440 A1 | 2/2019 | Novak et al. | |
| 2019/0339918 A1 | 11/2019 | Boule et al. | |

OTHER PUBLICATIONS

PCT/US2021/019415, "International Search Report and Written Opinion", dated Jun. 7, 2021, 13 pages.
PCT/US2021/019430, "International Search Report and Written Opinion", dated Jun. 4, 2021, 19 pages.
PCT/US2021/019415, "Written Opinion of the International Preliminary Examining Authority", dated Nov. 10, 2021, 8 pages.

* cited by examiner

GAME CONSOLE APPLICATION WITH ACTION CARD STRAND

BACKGROUND OF THE INVENTION

Graphical user interfaces (GUIs) are the predominant type of interfaces available to users for interacting with computer systems. A GUI includes selectable icons to launch applications. Typically, upon a launch of a first application, the first application is presented in a first window. Upon a launch of a second application, a second window is used and the user control shifts from the first window to the second one. In addition, dynamic content (e.g., interactive media content) presented in the first window may be paused. If the user desires to interact with the first application, additional user input is needed to shift the control from the second window back to the first one.

To illustrate, consider an example of a GUI of a video game system hosting a video game application and a music streaming application. The GUI presents a home page that includes a video game icon and a music streaming icon. From this home page, a video game player selects the video game icon to launch the video game application. Video game content is then presented in the GUI. To stream music, the video game player may need to pause the execution of the video game application, switch back to the home page, and select the music streaming icon. Upon this selection, the music streaming application is launched and music can be played over speakers of the video game system. To resume the video game, the video game player may need to minimize the window of the music streaming application, switch back to the home page, expand the window of the video game application, and un-pause the video game content.

Hence, although a GUI can be an effective user interface, switching between applications may not be seamless and the presentation of information may be limited to an active window. There is a need for an improved GUI that allows better information sharing and control switching.

BRIEF SUMMARY OF THE INVENTION

Embodiments of the present disclosure relate to techniques for better information sharing and control switching in a graphical user interface (GUI). In an example, a computer system for presenting a dynamic menu for different applications of the computer system, a method implemented by the computer system, and one or more non-transitory computer-readable media storing computer-readable instructions executable on the computer system are described. In particular, a menu application of the computer system determines active computing services and inactive computing services available from the different applications. The menu application determines a first order of presentation of first windows within the dynamic menu. Each of the first windows corresponds to one of the active computing services. The first order indicates an arrangement of the first windows based on at least one of: (i) timing of activating the active computing services, or (ii) timing of interacting with the active computing services. The menu application determines a context of at least one of: a user application of the computer system, a system application of the computer system, or a user of the computer system. The menu application determines, based on the context, a second order of presentation of second windows within the dynamic menu. Each of the second windows corresponds to one of the inactive computing services. The second order is predefined for the context, indicates an arrangement of the second windows according to application types, and is different from another order predefined for another context. The menu application presents the first windows within the dynamic menu according to the first order and the second windows within the dynamic menu according to the second order. One or more of the first windows and one or more of the second windows are presented in a first presentation state. One of the first windows or one of the second windows is presented in a second presentation state. The second presentation state presents more information relative to the first presentation state.

DETAILED DESCRIPTION OF THE INVENTION

Figure 1:
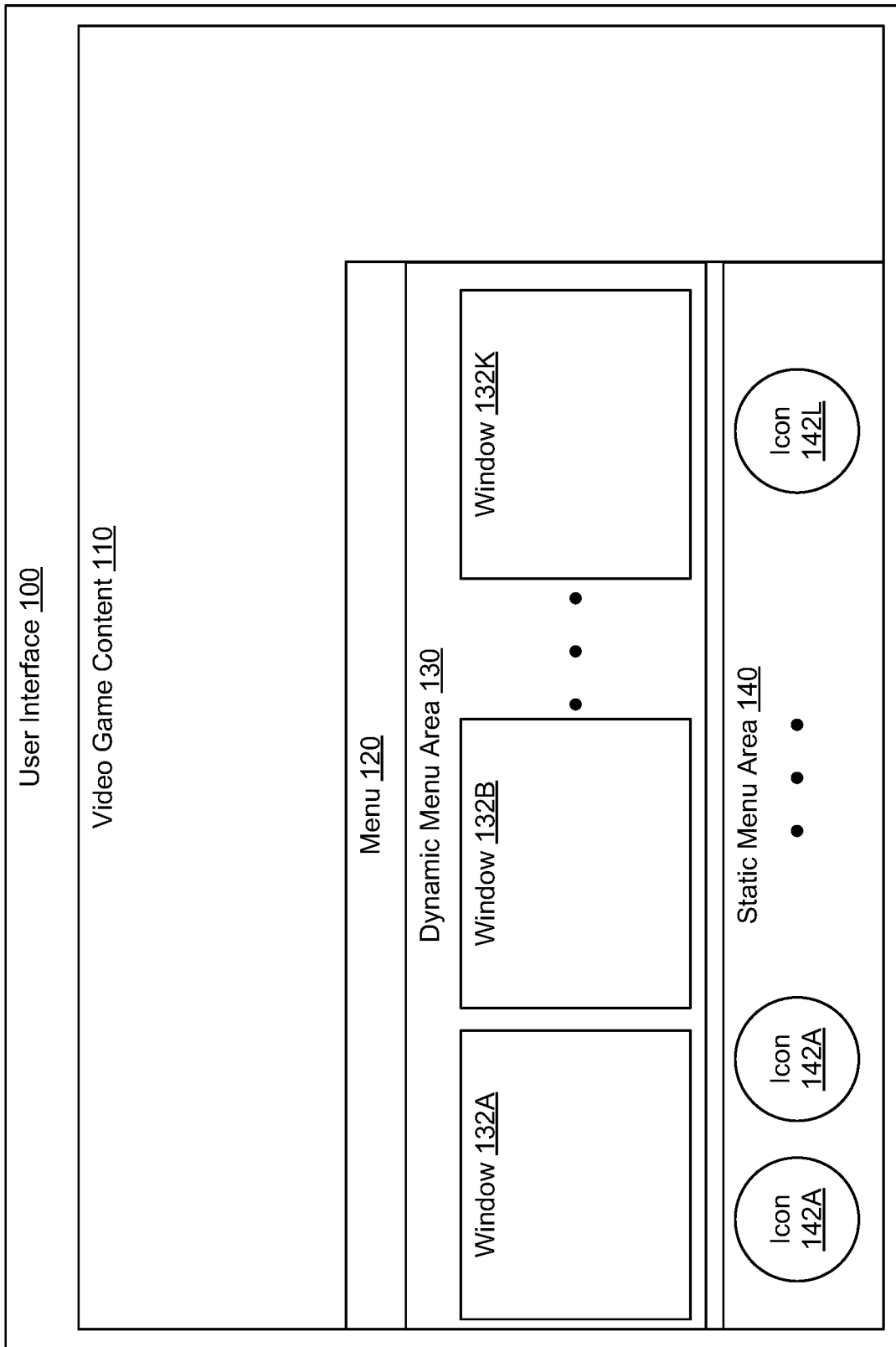
FIG. 1 illustrates an example of a menu with selectable actions, according to an embodiment of the present disclosure.

Generally, systems and methods for better information sharing and control switching in a graphical user interface (GUI) are described. In an example, a computer system presents a GUI on a display. Upon user input requesting a menu, the menu is presented in the GUI based on an execution of a menu application. The menu includes a dynamic area that presents a plurality of windows. Each of the windows corresponds to a target application and can be included in the dynamic menu area based on whether the target application is active or inactive, and depending on a context if the target application is inactive. The dynamic menu area shows the windows in a first presentation state (e.g., glanced state), where each window presents content in this presentation state. Upon user interactions with the dynamic menu area, the presentation of the windows can change to a second presentation state (e.g., focused state), where a window in the second state and its content are resized and where an action performable on the content can be selected. Upon a user selection of the window in the second state, the presentation of the window changes to a third presentation state (e.g., selected state), where the windows and its content are resized again and where an action performable on the window can be further selected.

In a further example, implementing the above UI functions via the GUI is a computer system executing one or more applications for generating and/or presenting windows in one of the presentation states in the menu (referred to herein as a dynamic menu as it includes a dynamic menu area). For instance, the computer system executes the menu application to, upon a user request for the dynamic menu, present windows in the first or second states and populates windows in the dynamic menu with content associated with either active or inactive applications of the computer system. In particular, the menu application determines a first order of windows and a second order of windows, associated with active applications and inactive applications, respectively. Each order may include multiple sub-groupings of windows, based on criteria including, but not limited to, relevance, timing, and context, to improve user accessibility and promote interaction with applications of the computer system. The menu application may generate and/or present the dynamic menu to include the first order of windows arranged horizontally adjacent to the second order of windows in a navigable UI. User interaction with the dynamic menu may permit the user to view one or more windows in the first order and/or the second order in the focused state.

To illustrate, consider an example of a video game system. The video game system can host a menu application, a video game application, a music streaming application, a video streaming application, a social media application, a chat application (e.g., a "party chat" application), and multiple other applications. A video game player can login to the video game system and a home user interface is presented thereto on a display. From this interface, the video game player can launch the video game application and video game content can be presented on the display. Upon a user button push on a video game controller, a menu can be presented in a layer at the bottom of the display based on an execution of the menu application. The menu includes a dynamic area, presenting multiple windows, each associated with an application of the video game system (e.g., the video game application, the music streaming application, etc.) The windows within the dynamic area of the menu are shown in a glanced state, providing sufficient information to the video game player about the applications (e.g., to perceive the car race invitation and to see a cover of the music album). By default, only one of the windows is shown in a focused state at a time and remaining windows are shown in the glanced state. Focus is shifted within the dynamic menu by navigating between windows, for example, by using a video game controller to scroll through the dynamic menu. For instance, upon the user focus (e.g., the user scroll) being on the music window, that window is expanded to show a partial list of music files and to present a play key. By default, windows associated with the video game application are arranged to the left of the dynamic menu in a horizontal arrangement, where each window presents content from a different service of the video game application. For example, the first window, presented in the focused state, could present content related to the video game player's recent accomplishments in the video game application (e.g., trophies, replays, friend or fan reactions, etc.). Similarly, another window to the right in the dynamic menu could include additional and/or newly available levels for the video game player to choose from. A third window could present content related to online gaming communities and/or sessions to join. In this way, the dynamic menu can provide multiple points of access to different services available in the video game platform in a single organized menu of horizontal windows. Additionally, the dynamic menu may present windows from inactive applications, for example, to the right of those associated with active applications. Inactive applications could be related to the game, for example a chat that took place in the game, or could be unrelated, for example, a music player application. The menu application may organize the two sets of windows differently. For example, the windows to the left, for active application services, may be organized by timing, such as the most recently accessed service is at the far left and by default in the focused state. The windows to the right, associated with inactive application services, may be organized by relevance to the video game application and/or by context of the user and the system.

Embodiments of the present disclosure provide several advantages over existing GUIs and their underlying computer systems. For example, by selecting windows for presentation in a dynamic menu, relevant application information can be surfaced to a user. In this way, the user may access multiple application services for an active application and may be presented with services from multiple inactive application services in the same UI element. By presenting the dynamic window in a horizontal linear arrangement of windows including both active application services and inactive application services, based on the user focus, navigation of UI menus and menu trees is reduced to a single linear menu that determines content dynamically for presentation to the user. Such techniques reduce system computational demands, arising from repeatedly rendering menus, and improve user experience by reducing frustration and fatigue caused by inefficient menu navigation.

In the interest of clarity of explanation, the embodiments may be described in connection with a video game system. However, the embodiments are not limited as such and similarly apply to any other type of a computer system. Generally, a computer system presents a GUI on a display. The GUI may include a home user interface from which different applications of the computer system can be launched. Upon a launch of an application, a window that corresponds to the application can be presented in the GUI.

FIG. 1 illustrates an example of a menu with selectable actions, according to an embodiment of the present disclosure. As illustrated, a graphical user interface 100 of a computer system (e.g., a video game system) is presented on a display. The GUI 100 presents video game content 110 of a video game application of the computer system (e.g., one executed by the video game system) and a menu 120 of a menu application of the computer system (e.g., one executed by the video game system). The menu 120 can be presented over at least a portion of the video game content 110 such that to appear in the foreground of the GUI 100 while the video game content 110 appears in the background of the GUI 100. For instance, the menu 120 and the video game content 110 are displayed within a menu window and a content window, respectively, where the menu window is shown in a layer that is over the content window and that overlaps with only a portion of the content window.

In an example, the menu 120 can occlude the portion of the video content 110 behind it or can have some degree of transparency. Additionally or alternatively, the texturing and/or brightness of the menu 120 and the video game content 110 can be set such that the menu 120 appears in the foreground and the video game content 110 appears in the background.

As illustrated, the menu 120 includes a dynamic menu area 130 and a static menu area 140. The dynamic menu area 130 presents a plurality of windows 132A, 132B, . . . , 132K, each of which corresponds to an application of the computer system. The static menu area 140 presents icons 142A, 142B, . . . , 142L, each of which corresponds to a system function (e.g., power on, volume control, mute and unmute, etc.) or an application of the computer system. For brevity, each of the windows 132A, 132B, . . . , 132K is referred to herein as a window 132 and each of the icons 142A, 142B, . . . , 142L is referred to as an icon 142. By containing the two areas 130 and 140, the menu 120 represents a dashboard that shows contextually relevant features and relevant system functions without necessitating the user to exit their game play.

Generally, a window 132 is added to the dynamic menu area 130 based on a determination of potential relevance to the user of the GUI 100, as described in more detail in reference to the following figures, below. A window 132 is added to the dynamic menu area 130 according to an order, where windows within the dynamic menu area 130 can be arranged based on the potential relevance to the user. In comparison, the static menu area 140 may not offer the dynamicity of the dynamic menu area 130. Instead, the icons 142 can be preset in the static menu area 140 based on system settings and/or user settings. Upon a selection of an icon 142, a corresponding window (e.g., for a system control or for a particular background application) can be presented. The menu 120 can be dismissed while the window is presented, or alternatively, the presentation of the menu 120 persists.

The content, interactivity, and states of the windows 132 are further described in connection with the next figures. Generally, upon the presentation of the menu 120, the execution of the video game application and the presentation of the video game content 110 continue. Meanwhile, user input from an input device (e.g., from a video game controller) can be received and used to interact with the menu 120 in the dynamic area 130 and/or the static area 140. The dynamic area interactions allow the user to view windows 132 in different states, and select and perform actions on the content of the windows 132 or the windows 132 themselves. The static area interactions allow the user to select any of the icons 142 to update the system functions (e.g., change the volume) or launch a preset window for a specific application (e.g., launch a window for a music streaming application).

Once the interactions end, the menu 120 is dismissed and the user control automatically switches to the video game application (e.g., without input of the user explicitly and/or solely requesting the switch). Alternatively, the switch may not be automatic and may necessitate the relevant user input to change the user control back to the video game application. In both cases, user input received from the input device can be used to interact with the video game content 110 and/or the video game application.

Although FIG. 1 describes a window as being presented in a dynamic menu area or can be launched from an icon in a static menu area, other presentations of the window are possible. For instance, user input from the input device (e.g., a particular key push) can be associated with the window. Upon receiving the user input, the window can be presented in a layer over the video game content 110, without the need to present the menu 120.

Figure 2:
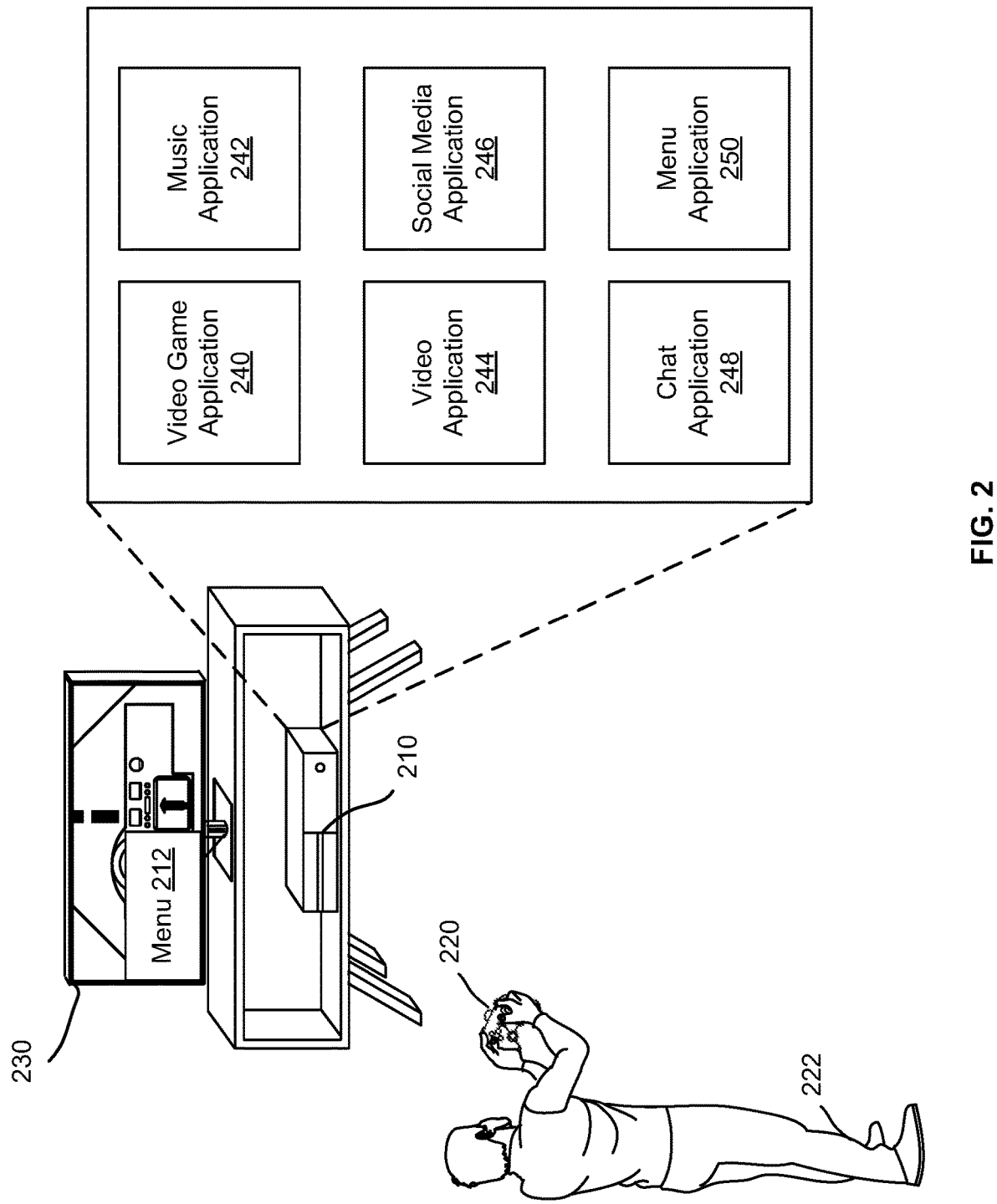
FIG. 2 illustrates an example of a computer system that presents a menu, according to an embodiment of the present disclosure.

FIG. 2 illustrates a computer system that presents a menu, according to an embodiment of the present disclosure. As illustrated, the computer system includes a video game console 210, a video game controller 220, and a display 230. Although not shown, the computer system may also include a backend system, such as a set of cloud servers, that is communicatively coupled with the video game console 210. The video game console 210 is communicatively coupled with the video game controller 220 (e.g., over a wireless network) and with the display 230 (e.g., over a communications bus). A video game player 222 operates the video game controller 220 to interact with the video game console 210. These interactions may include playing a video game presented on the display 230, interacting with a menu 212 presented on the display 230, and interacting with other applications of the video game console 210.

The video game console 210 includes a processor and a memory (e.g., a non-transitory computer-readable storage medium) storing computer-readable instructions that can be executed by the processor and that, upon execution by the processor, cause the video game console 210 to perform operations relates to various applications. In particular, the computer-readable instructions can correspond to the various applications of the video game console 210 including a video game application 240, a music application 242, a video application 244, a social media application 246, a chat application 248, a menu application 250, among other applications of the video game console 210 (e.g., a home user interface (UI) application that presents a home page on the display 230).

The video game controller 220 is an example of an input device. Other types of the input device are possible including, a keyboard, a touchscreen, a touchpad, a mouse, an optical system, or other user devices suitable for receiving input of a user.

In an example, the menu 212 is similar to the menu 130 of FIG. 1. Upon an execution of the video game application 240, a rendering process of the video game console 210 presents video game content (e.g., illustrated as a car race video game content) on the display 230. Upon user input from the video game controller 220 (e.g., a user push of a particular key or button), the rendering process also presents the menu 212 based on an execution of the menu application 250. The menu 212 is presented in a layer over the video game content and includes a dynamic area and a static area. Windows in the dynamic area correspond to a subset of the applications of the video game console.

Upon the presentation of the menu 212, the user control changes from the video game application 240 to the menu application 250. Upon a receiving user input from the video game controller 220 requesting interactions with the menu 212, the menu application 250 supports such interactions by updating the menu 212 and launching any relevant application in the background or foreground. The video game player 222 can exit the menu 212 or automatically dismiss the menu 212 upon the launching of an application in the background or foreground. Upon the exiting of the menu 212 or the dismissal based on a background application launch, the user control changes from the menu application 250 to the video game application 240. If a foreground ground application is launched, the user control changes from the menu application 250 to this application instead. In both cases, further user input that is received from the video game controller 220 is used for controlling the relevant application and/or for requesting the menu 212 again.

Although FIG. 2 illustrates that the different applications are executed on the video game console 210, the embodiments of the present disclosure are not limited as such. Instead, the applications can be executed on the backend system (e.g., the cloud servers) and/or their execution can be distributed between the video game console 210 and the backend system.

Figure 3:
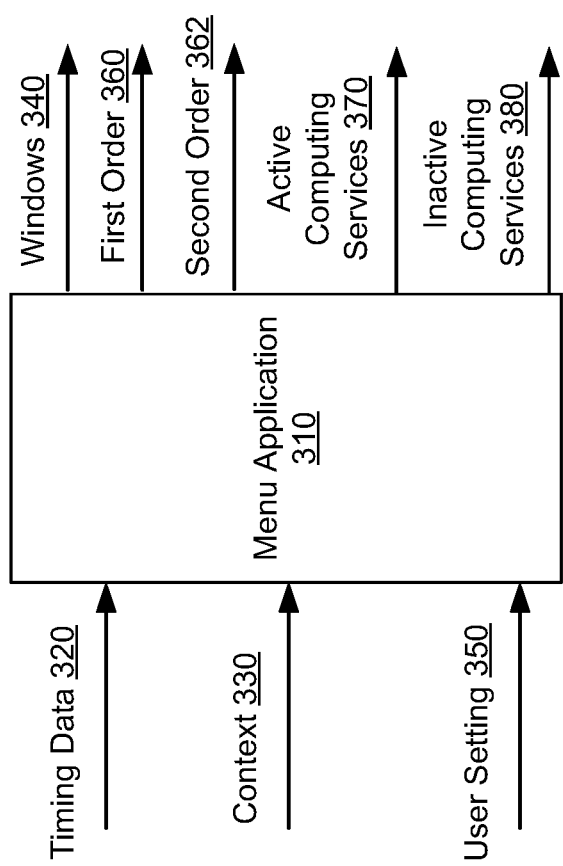
FIG. 3 illustrates an example of a context-based selection of windows, according to an embodiment of the present disclosure.

FIG. 3 illustrates an example of a context-based selection of windows, according to an embodiment of the present disclosure. As illustrated, based on timing data 320 and a context 330, a menu application 310 includes windows 340 for a dynamic area of a menu. The menu application 310 determines a first order 360 for arranging one or more of the windows 340 in the dynamic menu associated with active computing services 370. Similarly, the menu application 310 determines a second order 362 for arranging one or more of the windows 340 in the dynamic menu associated with inactive computing services 380. The first order 360 may arrange windows 340 based on the timing data 120 as a measure of potential relevance to the user. Additionally, the menu application 310 may use the context 330 and the user setting 350 to determine an arrangement of windows 340 for inclusion in the second order 362 such that the second order 362 is of relevance to the user.

In an example, the context 330 generally includes a context of a user of the computer system (e.g., a video game player) and/or a context of an application being executed on the computer system, as described in more detail, below. The context 330 may be received over an application programming interface (API) of a context service, where this context service may collect contexts of the user from different applications of a computer system or a network environment, or from an application (e.g., a video game context can be received from a corresponding video game application). The user setting 350 may be received from a user account or from a configuration file.

Figure 4:
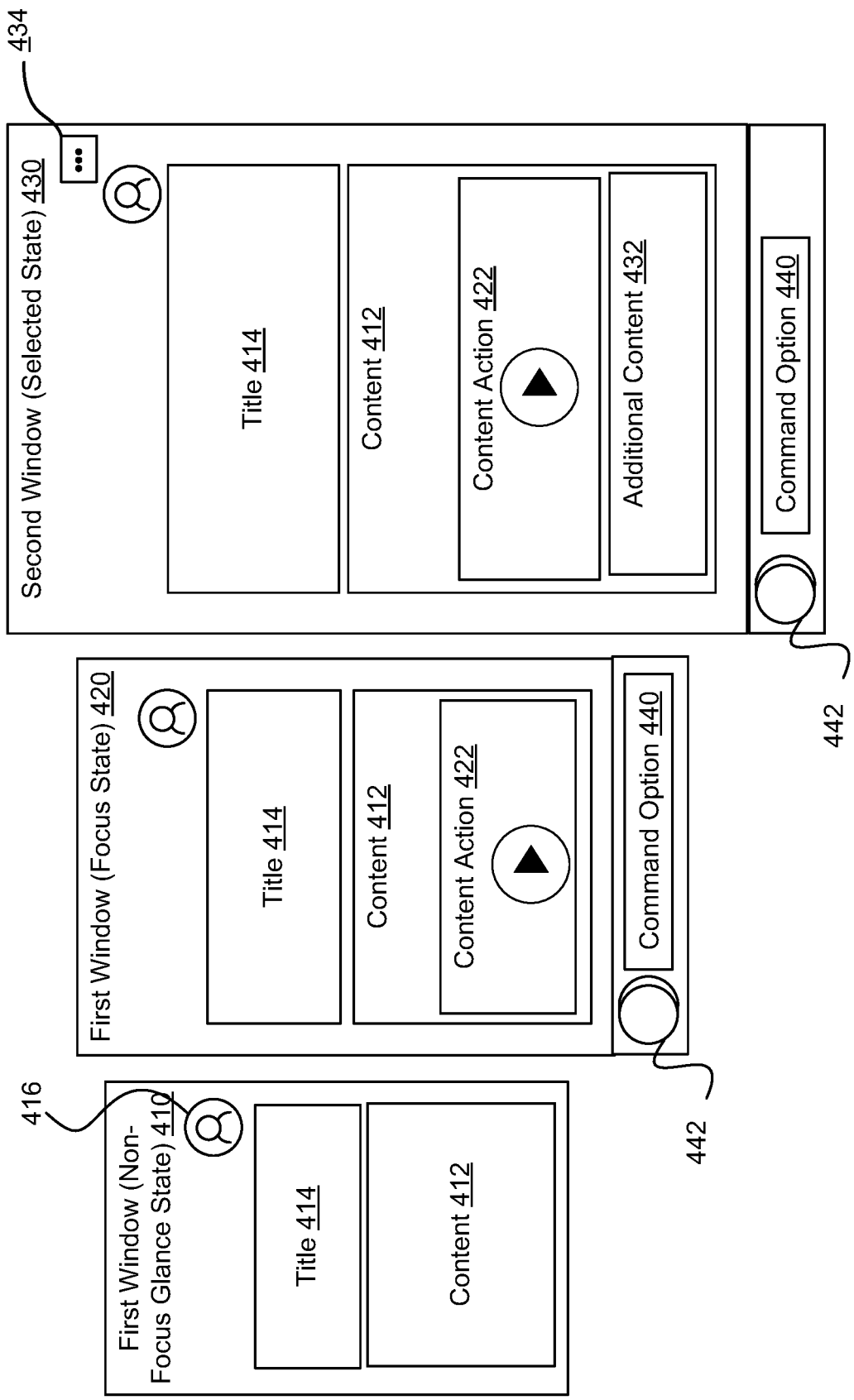
FIG. 4 illustrates an example of a window in different states, according to embodiments of the present disclosure.

FIG. 4 illustrates an example of a window in different states, according to embodiments of the present disclosure. Here and in subsequent figures, an action card is described as an example of a window and corresponds to an application. Generally, a window represents a GUI object that can show content and that can support an action performable on the content and/or window. In an example, the action card is a specific type of the window, where the action card includes a container object for MicroUX services, and where the action card contains content and actions for a singular concept. Action cards included in a menu facilitate immediate and relevant actions based on contexts of what the users are engaged with and the relationships of people, content, and services within a computer environment. Action cards included in the menu may be arranged horizontally and/or vertically in the GUI, and may be interactive. The menu may be dynamic and may include an arrangement of action cards that is responsive to the user interaction with the menu and a context.

As illustrated in FIG. 4, the action card can be presented in one of multiple states. Which state is presented depends on the user input, as further described in the next figures. One of the states can be a glanced state 410, where the action card provides a glance to the user about the application. The glance includes relevant information about the action card, where this information should help the user in deciding in taking an action or not. For example, in the glanced state 410, the action card has a first size, and presents content 412 and a title 414 of the content 412 or the action card based on the first size. To illustrate, an action card for a music application can be presented in the first state as a rectangle having particular dimensions, showing a cover and a title of a music album.

Another state can be a focused state 420, where the action provides relevant information to the user and one or more options for one or more actions to be performed (e.g., for one or selectable actions on content of the application or the action card itself). In other words, the action card can surface quick actions for the user to select in response to the user's focus being on the action card. For example, in the focused state 420, the action card has a second size (which can be larger than the first size), resizes the presentation of the content 412 and the title 414 based on the second size, and presents one or more selectable content actions 422 (e.g., play content, skip content, etc.) and one or more selectable card actions (e.g., move the action card to a position on the display, resize the action card, pint the action card, present the action card as a picture-in-picture, etc.). Referring back to the music action card illustration, in the focused state 420, the music cover and album title are enlarged and a play button to play music files of the music album is further presented.

Yet another state can be a selected state 430, where the action continues to provide relevant information to the user in a further enlarged presentation format, and provides one or more options for one or more actions to be performed on the connect and/or the action card itself (e.g., for one or selectable actions on content of the application or the action card itself). In other words, the action card becomes the primary modality for interacting with the MicroUX and displays the relevant visual interface. For example, in the selected state 430, the action card has a third size (which can be larger than the second size), resizes the presentation of the content 412 and the title 414 based on the third size, continues the presentation of the content action 422, presents additional content 432 of the application, and presents one or more options 434 for one or more content actions or card actions that can be performed on the action card. Upon a user selection of the option 434, the card actions are presented and can be selected. Referring back to the music action card illustration, in the selected state 430, the music cover and album title are further enlarged and the presentation of the play button continues. Additional music files of the music album are also identified. In the above states, the content 412, title 414, content action 422, and additional content 432 can be identified from metadata received from the application.

As illustrated in FIG. 4, the action card can include a static presentation and a dynamic presentation area, each of which can be resized depending on the state. For instance, the title 414 is presented in the static area, identifies the underlying application associated with the action card and does not change with the state. In comparison, the content 412 can be presented in the dynamic area and can change within each state and between the states. In particular, the content itself may be interactive (e.g., a video) and its presentation can by its interactive nature change over time. Additionally or alternatively, the content 412 can also be changed over time depending on the user context and/or the application context.

As illustrated in FIG. 4, the action card in the glanced state 410, the action card in the focused state 420, and the action card in the selected state 430 each include an icon 416. The icon 416 may be an image representative of one or more things including, but not limited to, the user (e.g., a profile picture), the computer system (e.g., a system logo or image), a target application (e.g., a badge or icon from the application), and a system icon representing the type of target application (e.g., a general symbol for the type of content being presented, for example, a music note for an audio player, a camera for an image gallery, a microphone for a chat application, etc.).

As illustrated in FIG. 4, in an action card in the focused state (e.g., focused state 420) one or more command options 440 are included. While FIG. 4 shows the command options 440 in a panel positioned lower than the content, the command options 440 could be positioned as an overlay in front of the content, in a side panel, and/or positioned above the content near the title 414. The command options 440 may include textual or image-based instructions or may include one or more interactive elements 442 such as buttons or other virtual interactive elements. For example, the interactive elements 442 may include a button configured to receive a user-click. In some embodiments, the command options 440 and the interactive elements 442 facilitate interaction with content 412 and/or additional content 432. For example, the command options may provide additional and/or alternative function control over content beyond what is provided by content action 422. To illustrate, the content action 422 may provide a play/pause function for an audio or video player, while one of the command options 440 may include a mute/unmute function for a party chat application. As a further example, the command options 440 may be context-specific, based on the current state of the content in the action card. For example, when an action card is playing audiovisual content, the command options 440 may include only a mute button, rather than a mute/unmute button, and a stop button, rather than a play button.

In reference to the figures, below, the term action card is used to describe a window in one or more of the presentation states. For example, a window presenting content in the dynamic menu that is associated with an application on the computer system that is different from the menu application is referred to as an "action card." Further, the action cards are illustrated as being presented sequentially next to each other along a horizontal line. However, the embodiments are not limited as such and can include other arrangements based on different orders of inactive and active service. For instance, the action cards can be presented sequentially along a vertical line.

Figure 5:
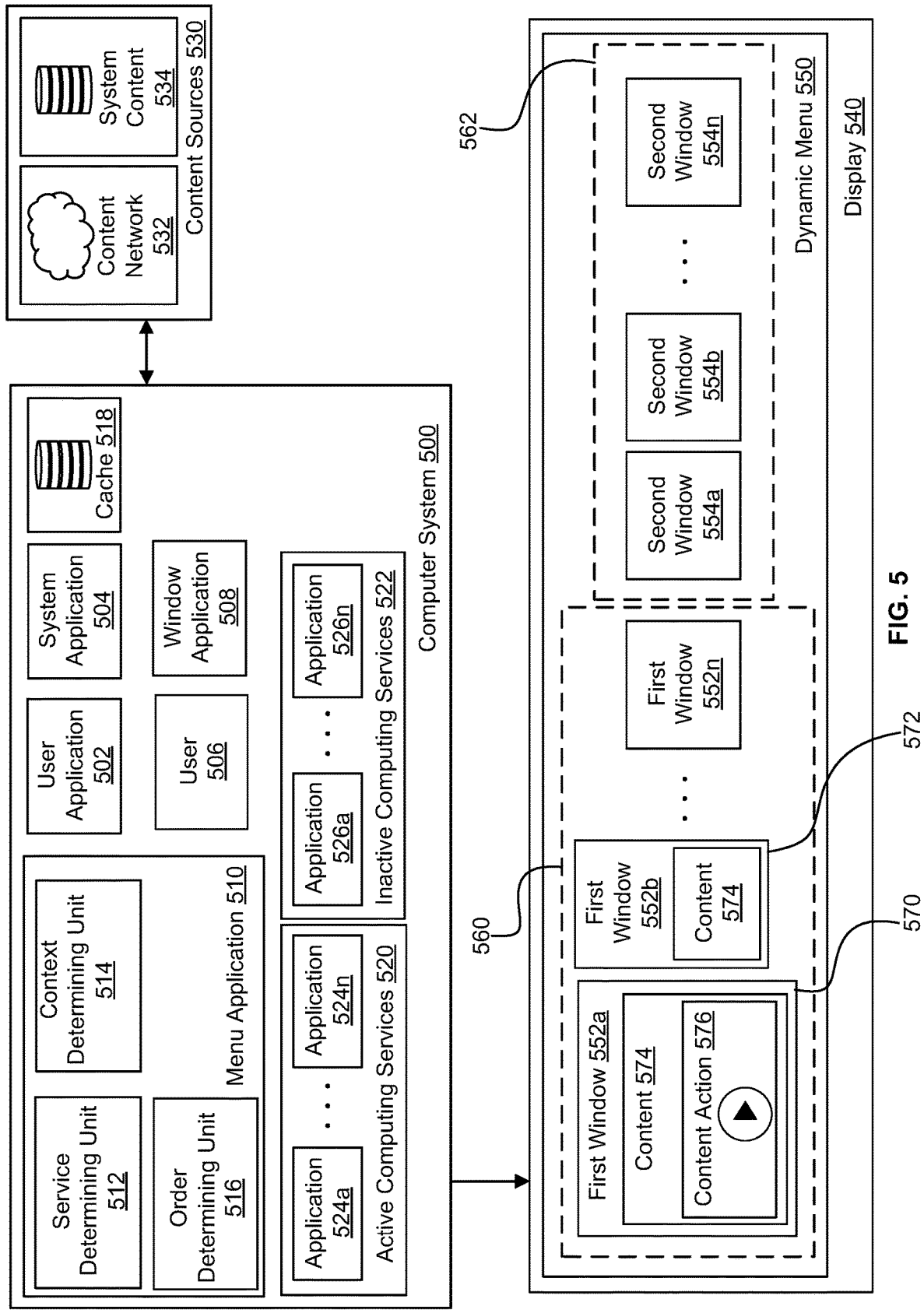
FIG. 5 illustrates an example of a computer system that presents a dynamic menu populated with action cards, according to an embodiment of the present disclosure.

FIG. 5 illustrates an example of a computer system 500 that presents a dynamic menu 550 populated with action cards, according to an embodiment of the present disclosure. As illustrated in FIG. 5, the computer system 500 includes a menu application 510 (e.g., menu application 310 of FIG. 3), which includes a service determining unit 512, a context determining unit 514, and an order determining unit 516. These are described as sub elements of the menu application 510, but may also be different applications of the computer system 500, providing data to the menu application 510 for the menu application 510 to perform operations. For example, the menu application 510 may determine active computing services 520 and inactive computing services 522. Services may refer to functionality available to a user 506 and/or the computer system 500, from different applications. For example, a song, playable using a media player application, may be available to the user 506 as an inactive computing service 522. In this way, multiple inactive computing services 522 may be available from multiple applications 526*a-n*. As illustrated in FIG. 5, the active computing services 520 may be provided from the applications 524*a-n* that are already running the respective active computing services 520. For example, an active computing service 520 may be a video game service available from a video game application (e.g., game navigation or mission selection). As another example, a chat application may be running a chat service as an active computing service 520.

As illustrated in FIG. 5, the menu application 510 determines a first order 560 and a second order 562 for presenting action cards in a dynamic menu 550 via a display 540. As described in more detail in reference to FIGS. 1-2, the dynamic menu 550 may form a part of a larger menu (e.g., menu 120 of FIG. 1) overlaid on other content, such as a user application 502, in response to input received by computer system 500 from user 506. The first order 560 includes one or more action cards 522*a-n* (also referred to as action cards 522 for simplicity), where "a," "b," and "n" represent integer numbers greater than zero and "n" represents the total number of action cards 552. As illustrated, by default an action card 552*a* of the action cards 522 is presented in the focused state, as described in more detail in reference to FIG. 4. In the focused state (e.g., focused state 420 of FIG. 4) the action card 552*a* includes content 574 (e.g., content 412 of FIG. 4) received by the computer system 500 from one or more content sources 530 and a content action 576 (e.g., content action 422 of FIG. 4) associated with content 574. Content sources 530 may include a content network 532, including, but not limited to, a cloud-based content storage and/or distribution system. The content sources 530 may also include system content 534 provided by a data store communicatively coupled with the computer system (e.g., a hard drive, flash drive, local memory, external drive, optical drive, etc.). The first order 560 may be determined based on at least one timing factor for each active computing service of the active computing services 520. For example, the menu application 510 may determine the first order 560 based on arranging the action cards 552 in order of most recent interaction with the user 506 (e.g., last-played). Similarly, the first order 560 may be based on how frequently the user 506 interacts with applications 524 from which active computing services 520 are available (e.g., most-played, favorites, etc.). Alternatively, the first order 560 may be based on timing of activation of the active computing services 520, for example, which active computing service 520 was most recently activated by the user 506. Activating a computing service may include initiating, executing, and/or running an application on the computer system 500 based on a request by the user 506 and/or by a background process operating on the computer system 500. As such, the first order may arrange the action cards 552 according to a "most recently opened" arrangement.

As illustrated in FIG. 5, the second order 562 describes an arrangement of the action cards 554*a-n* on the dynamic menu 550 presented on the display 540. The action cards 554*a-n* (also referred to as action cards 554 for simplicity) may be presented in the glanced state (e.g., glanced state) by default. In some embodiments, at least one action card of the action cards 554 may be presented in the focused state (e.g., focused state) by default. The arrangement of action cards 554 in the second order 562 may be based on a context, determined by the menu application 510 (e.g., using order determining unit 516). The context may be based on a user application 502 of the computer system 510, a system application 504 of the computer system, and/or the user 506. A context of the user 506 (user context) generally includes any of information about the user 506, an account of the user, active background applications and/or services, and/or applications and/or services available to the user 506 from the computer system 550 or from other network environment (e.g., from a social media platform). A context of the application (user application 502 and/or system application 504 context) generally includes any information about the application, specific content shown by the application, and/or a specific state of the application. For instance, the context of a video game player (user context) can include video game applications, music streaming applications, video streaming applications, social media feeds that the video game player has subscribed to and similar contexts of friends of the video game player. The context of a video game application includes the game title, the game level, a current game frame, an available level, an available game tournament, an available new version of the video game application, and/or a sequel of the video game application. In some embodiments, context may be determined by the menu application 510 from data describing features, aspects, and/or identifiers of the user application 502, the system application 504, and the user 506 for which context is being determined. For example, the computer system 500 may maintain a profile of the user 506 in system content 534 that includes data describing biographic information, geographic location, as well as usage patterns. From that profile, the menu application 510 may derive one or more elements of user context (e.g., user context 320 of FIG. 3). To illustrate the example, biographical information of the user 506 may indicate that the user 506 is a legal minor. This information may be used in determining a user context based upon which the second order 562 may exclude any inactive computing services 522 restricted to other users over the age of legal majority. In this way, the second order 562 is defined for a given context and the order of action cards 554 is also pre-defined based on the context. For other user, system application, or user application contexts, however, the second order 562 may differ. Furthermore, the second order 562 may include action cards 554 for inactive computing services 522 from multiple application types, for which the second order 562 indicates an arrangement of the action cards 554 according to application type. For example, second order 562 may include multiple action cards 554 for media-player services, two for video game services, and one for a party-chat service. The second order may, in some embodiments, determine the second order 562 such that the media player action cards are grouped together and the video game action cards are grouped together.

In some embodiments, the dynamic menu may present windows that include active windows and suggested windows. Such windows can be presented dependently or independently of presentation orders related to recency and contexts. An active window corresponds to an active computing service. A suggested window corresponds to an inactive computing service, where the inactive computing service has not been previously used by a user of the computer system, such as one that have not been previously accessed, activated, inactivated, closed, removed, deleted, and/or requested by the user. Such an inactive computing service is referred to herein as a new inactive computing service. For instance, a new inactive computing service of a video game application may include a newly unlocked level in the video game application or a new downloadable level content (DLC) available from a content server. In an example, the menu application may determine a number of active windows corresponding to active computing services and a number of suggested windows corresponding to new inactive computing services for presentation within the dynamic window. In determining that a suggested window is to be presented within the dynamic menu, new inactive services may additionally and/or alternatively be ranked or otherwise compared based on relevance to the user and/or a computing service(s) (whether active or inactive). In some cases, relevance may be determined based on a context of the user or the computing service(s). As described above, context includes system context, application context, and/or user context. For example, a newly unlocked video game level may be included in the dynamic menu as a suggested window based on the relevance to an active video game application, determined by user profile information indicating that the user typically launches unlocked video game levels.

As illustrated in FIG. 5, the first order 560 and the second order 562 indicate a horizontal arrangement of the action cards 552 and the action cards 554 in the dynamic menu 550. For example, the action cards 574 may be arranged in the dynamic menu 550 to the left of the action cards 554 in a linear horizontal arrangement. In this example, the action cards may be arranged in the dynamic menu 550 such that the right-most action card will be the action card 552n, which is positioned adjacent and to the left of the action card 554a, forming a linear arrangement of action cards making up the first order 560 and the second order 562 in the dynamic menu 550. In some embodiments, the arrangement of action cards according in the dynamic menu may differ from the linear and horizontal arrangement illustrated in FIG. 5. For example, the arrangement may be circular, vertical, curved, etc. In some embodiments, the dynamic menu may switch between first and action cards by exchanging positions on the display, putting the action cards 554 in, for example, the left-most position in the arrangement.

Figure 6:
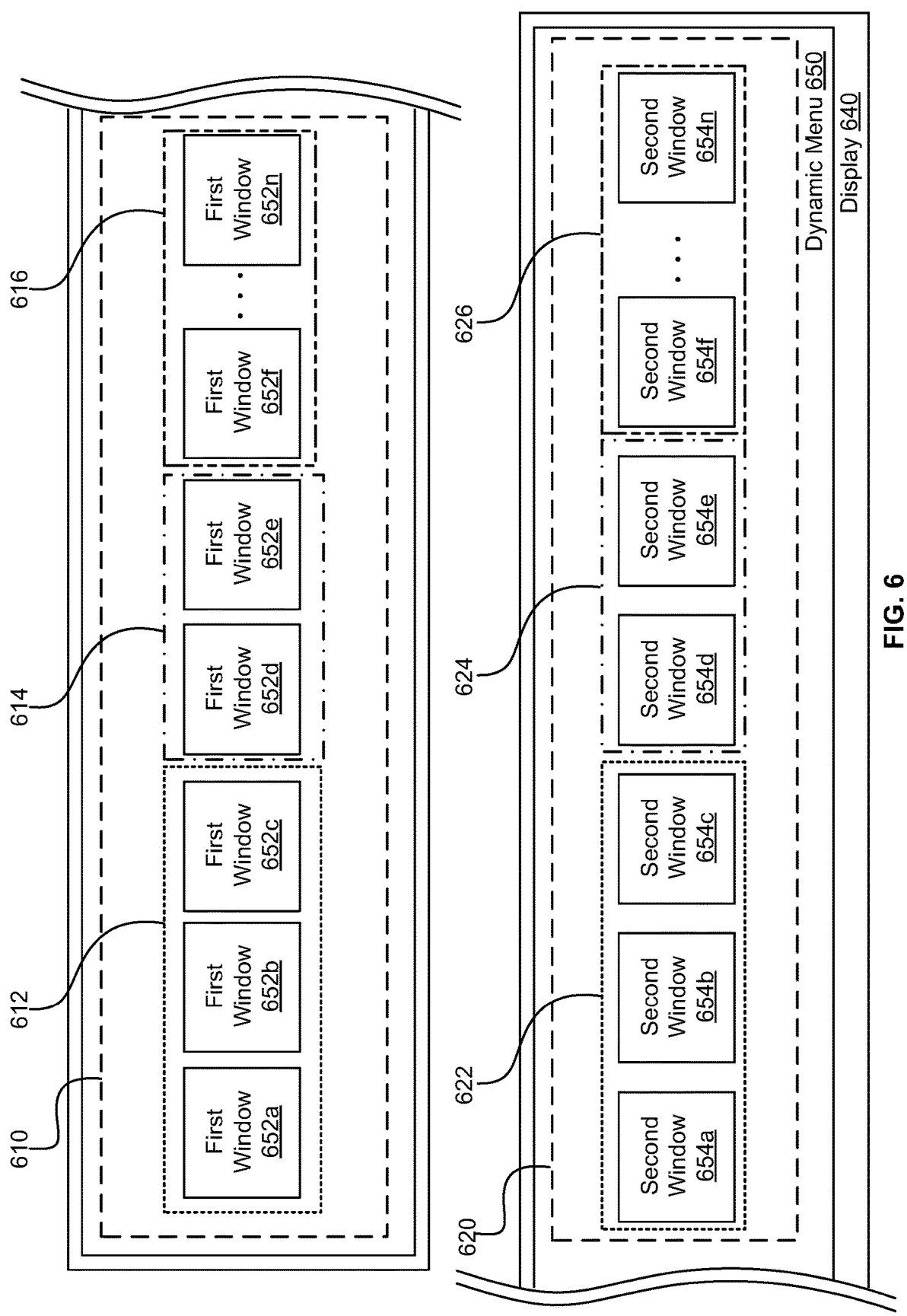
FIG. 6 illustrates an example of a display that presents a dynamic menu including interactive action cards, according to an embodiment of the present disclosure.

FIG. 6 illustrates an example of a display that presents a dynamic menu including interactive action cards, according to an embodiment of the present disclosure. As illustrated in FIG. 6, a first order 610 and a second order 620 defines the arrangement of action cards in a dynamic menu 650 presented via a display 640. Multiple action cards 652a-n are arranged horizontally according to the first order 610, further organized in sets of action cards. For example, FIG. 6 includes a first set 612, a second set 614, and a third set 616. The sets may divide the action cards 652 by application type, for example, video game, social media application, web browser, etc. As an example, the action cards 652 arranged in the first set 612 may all present content of video games, while the action cards 652 arranged in the second set 614 may all present content of social media applications. Furthermore, the first order 610 may define a limit on a number of the action cards 652 in each set. For example, the first set 612 may be limited to three action cards 652, while the second set 614 may be limited to only two action cards 652, as illustrated in FIG. 6. The first order 610 may define more than three sets, and the number of sets and the maximum number of action cards for each set may be pre-defined and/or dynamic, to reflect context and usage of the computer system (e.g., computer system 500 of FIG. 5). When the number of possible action cards exceeds a predefined limit, particular action cards may be selected to meet this limit. Various selection techniques are possible. In one example technique, the selection is random. In another technique, the selection is based on a relevance to a user or an application. For instance, a user context and/or an application context can be used to rank the possible action cards and the highest ranked action cards are selected to meet the predefined limit.

FIG. 6 further illustrates a second order 620 defining multiple subsets. For example, a first subset 622, a second subset 624, and a third subset 626 divide the action cards 654 making up the second order 620. In some embodiments, the second order 620 may include additional or fewer subsets. The second order 620 may define subsets based on relevance to the first order 610. For example, the first subset 622 may include action cards 654 presenting content for inactive services of active applications (e.g., applications for which an active service is presented in an action card 652). In another example, the second subset 624 may include action cards 654 presenting content for inactive services for applications from the same application type as those presented in the first subset 622. In another example, the third subset 626 may include second action cards 654 presenting content for inactive services of a different application type from those presented in the first subset 622 and/or the second subset 624. As with the first order 610 sets, each subset of the second order 620 may include action cards 654 of a single application type, and the second order 620 may define a maximum number of action cards 654 of each application type to be included in the second order 620. For example, as illustrated in FIG. 6, the first subset 622 includes three action cards 654, while the second subset 624 includes two action cards 654. As with the first order 610, the second order may be pre-defined and/or dynamic, changing relative to the context.

Figure 7:
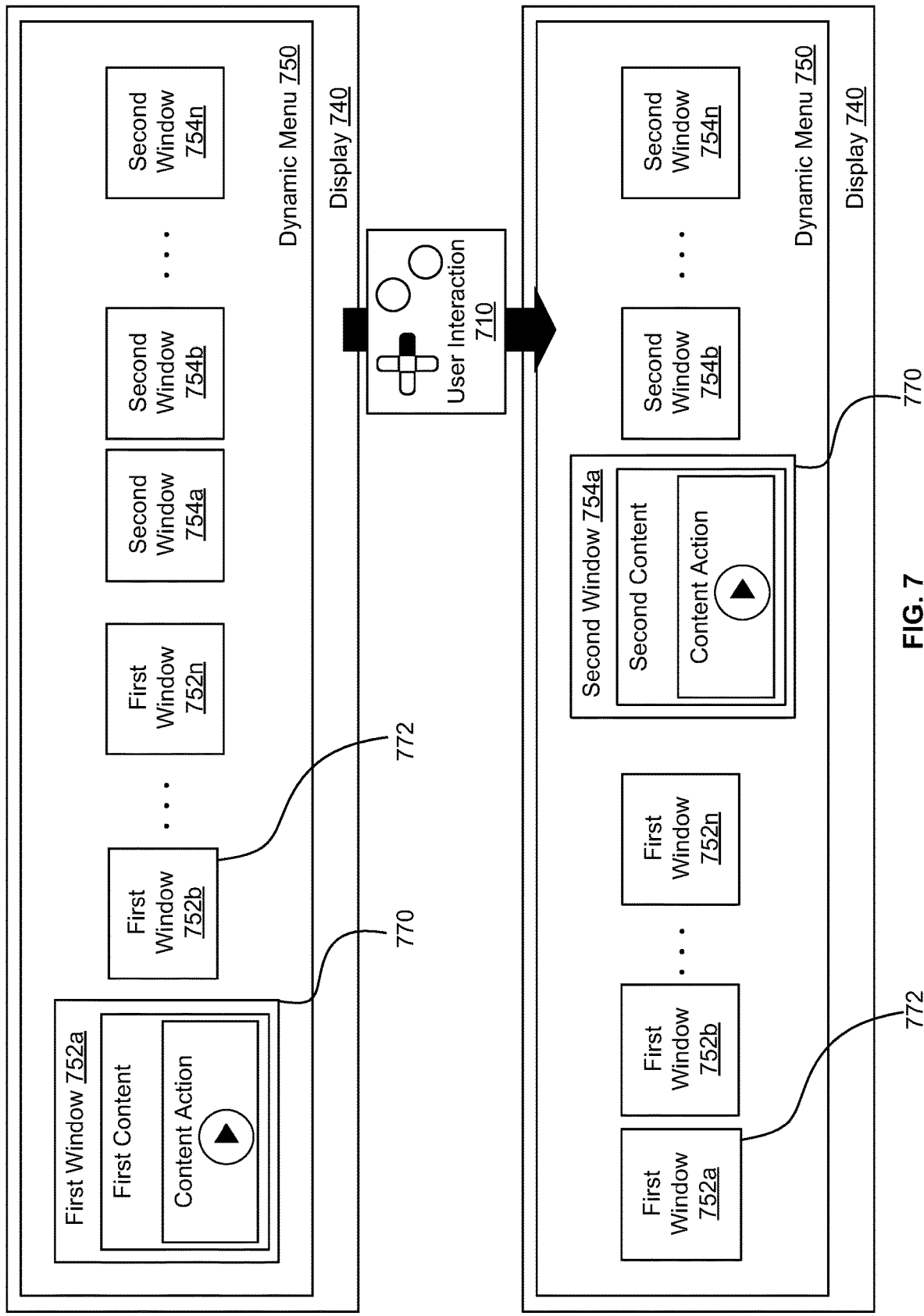
FIG. 7 illustrates an example of a display presenting a dynamic menu in response to user interaction, according to an embodiment of the present disclosure.

FIG. 7 illustrates an example of a display presenting a dynamic menu 750 in response to user interaction, according to an embodiment of the present disclosure. As illustrated in FIG. 7, the dynamic menu 750, presented via display 740, includes a horizontal arrangement of multiple action cards 752a-n from active computing services and multiple action cards 754a-n from inactive computing services. By default, the dynamic menu 750 presents only action card 752a in the focused state 770, and all other action cards in the glanced state 772. In response to a user interaction 710 (e.g., by a user input via input device 220 of FIG. 2), the action card states may be adjusted in the dynamic menu 750 to shift the action card 752a from the focused state 770 to the glanced state 772, while adjusting the action card 754a from the glanced state 772 to the focused state 770. In this way, the dynamic menu 750 facilitates interactions with the content present in the action cards, and provides a user (e.g., user 506 of FIG. 5) with access to applications and content.

Figure 8:
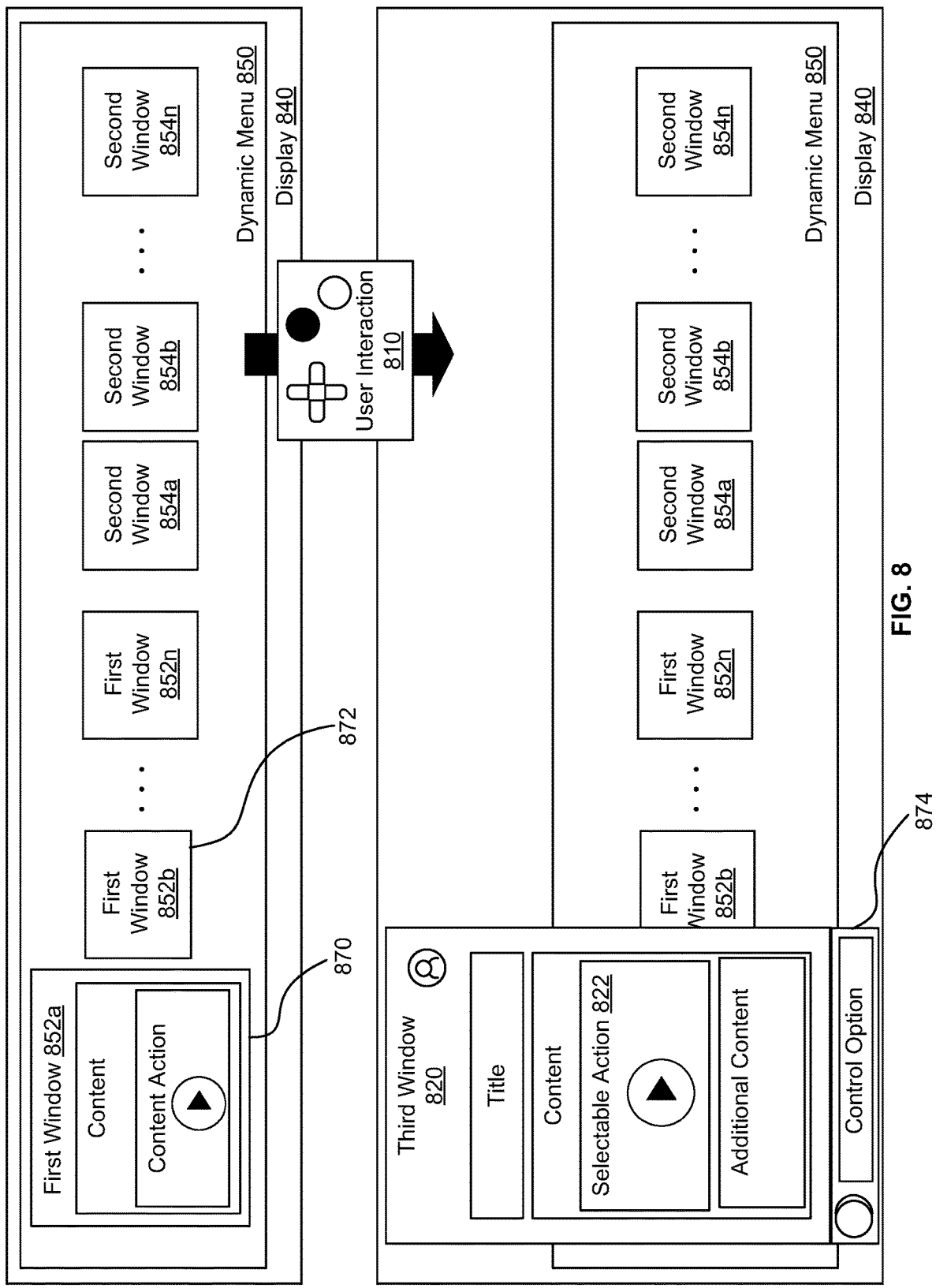
FIG. 8 illustrates another example of an action card in a dynamic menu, according to an embodiment of the present disclosure.

FIG. 8 illustrates another example of an action card in a dynamic menu 850, according to an embodiment of the present disclosure. As illustrated in FIG. 8, by default, the dynamic menu 850 presented via a display 840 includes multiple actions cards in a glanced state 872 and only one action card 852a in a focused state 870, as described in more detail in reference to FIG. 7. In response to a user interaction 810, for example via a user input device (e.g., user input device 220 of FIG. 2), to select the action card 852a in the focused state 870, the computer system (e.g., computer system 500 of FIG. 5) may generate and/or present via display 840 an action card 820 in the selected state 874 (e.g., selected state 430 of FIG. 4). As illustrated in FIG. 8, the selected state includes a selectable action 822 that permits a user to control dynamic content presented in the selected state 874, as described in more detail in reference to FIG. 4.

Figure 9:
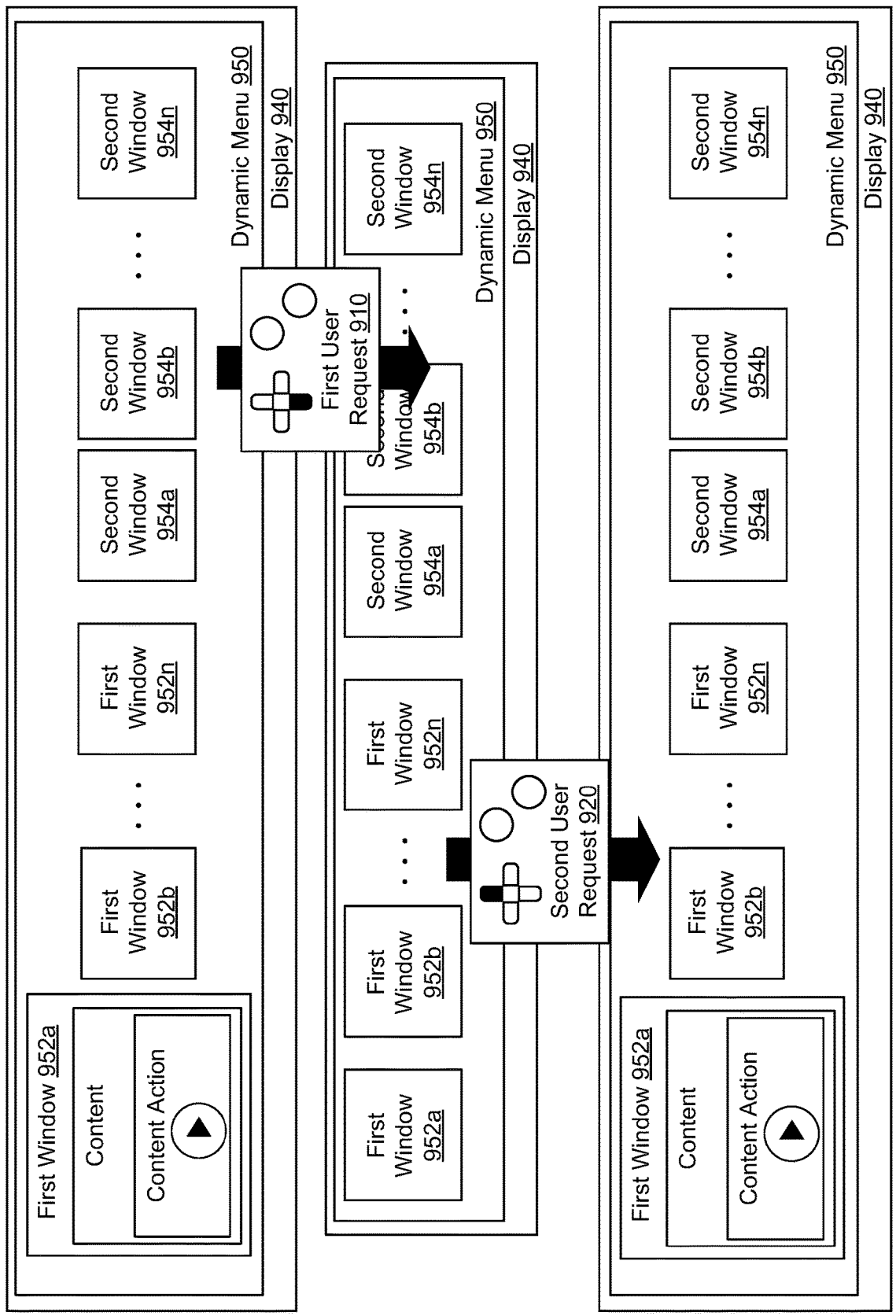
FIG. 9 illustrates an example of interaction with a dynamic menu, according to an embodiment of the present disclosure.

FIG. 9 illustrates an example of interaction with a dynamic menu 950, according to an embodiment of the present disclosure. As illustrated in FIG. 9, the dynamic menu 950 presented via a display 450 may be entered and exited through user interaction using an input device (e.g., input device 220 of FIG. 2). When the dynamic menu 950 is active, at least one action card is in the focused state. As illustrated in FIG. 9, action card 952a is in the focused state, while all remaining action cards are in the glanced state. In response to a user interaction 910, for example, a user request to exit, hide, minimize, or collapse the dynamic menu 950, the computer system (e.g., computer system 500 of FIG. 5) may adjust the action card 952a from the focused state to the glanced state via the action of a menu application (e.g., menu application 510 of FIG. 5). Similarly, in response to a user interaction 920 to enter, show, maximize, or erect the dynamic menu 950, the computer system, via the menu application, return the same action card 952a to the focused state from the glanced state. In some embodiments, the user interaction 910 and the user interaction 920 are the same action on the input device (e.g., press a single button successively to both hide and show the dynamic menu 950). Alternatively, the user interaction 910 and the user interaction 920 may be different actions, and reentering the dynamic menu 950 may not return action card 952a to the focused state, depending on a change in context between exiting and reentering the dynamic menu 940. For example, if the user exited the dynamic menu 940 to make some changes to active applications and/or processes via a different avenue of user interaction (e.g., static menu area 140 of FIG. 1), the ordering of action cards in the dynamic menu 950 may change, such that the action card 952 in the focused state may be different upon reentry, as described in more detail in reference to FIGS. 11-12, below.

Figure 10:
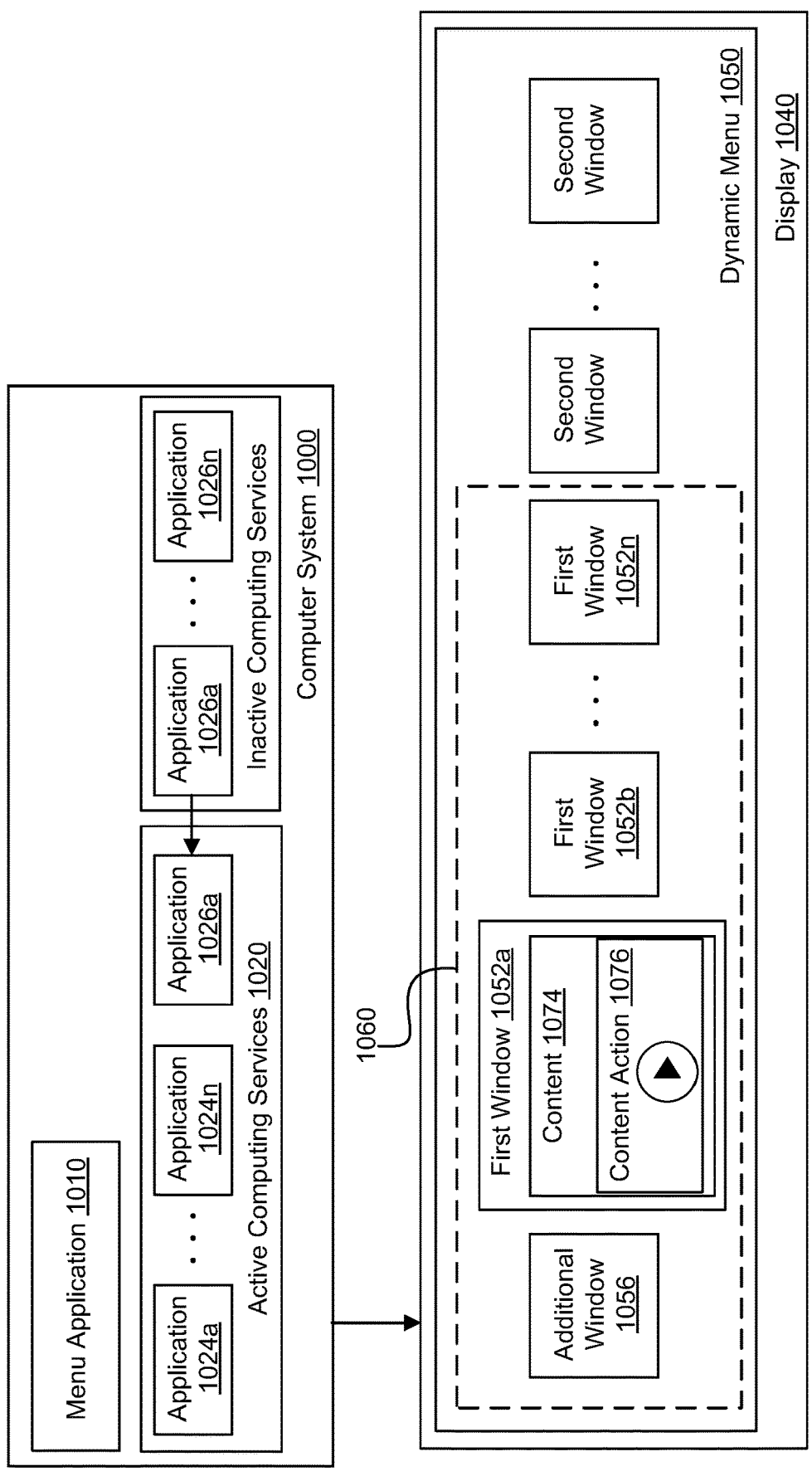
FIG. 10 illustrates an example of a computer system that adjusts a dynamic menu in response to activation of an application, according to an embodiment of the present disclosure.

FIG. 10 illustrates an example of a computer system 1000 that adjusts a dynamic menu 1050 in response to activation of an application 1026a, according to an embodiment of the present disclosure. As illustrated in FIG. 10, while the dynamic menu 1050 is being presented via a display 1040, multiple applications 1024 on the computer system may be running active computing services 1020, while other applications 1026 may be inactive. For example, a video game may be running, along with a party chat application, a web browser application, and a live-stream video application. As illustrated in FIG. 10, the application 1026a initializes while the dynamic menu 1050 is presented. In response, a menu application 1010 running on the computer system 1000 determines when the application 1026a activates, and generates and/or presents an additional action card 1056 as part of a first order 1060 in the dynamic menu 1050. As such, the additional action card 1056 appears in the dynamic menu 1050 in a horizontal arrangement of action cards 1052 as described in more detail in reference to FIG. 5. While FIG. 10 shows the additional action card 1056 in the left most position, it may appear in another position in the first order 1060. The process of adding the additional action card 1056 to the dynamic menu may occur in real time and without any user interaction as a default process of the menu application 1010. Alternatively, the menu application may generate and/or present a notification of a new active computing service 1020 corresponding to the application 1026a, for which the user (e.g., user 506 of FIG. 5) may select to add the additional action card 1056 to the dynamic menu 1050. In some embodiments, the additional action card 1056 may be presented in the focused state initially. Alternatively, the additional action card 1056 may be presented in the glanced state initially, as illustrated in FIG. 10.

Figure 11:
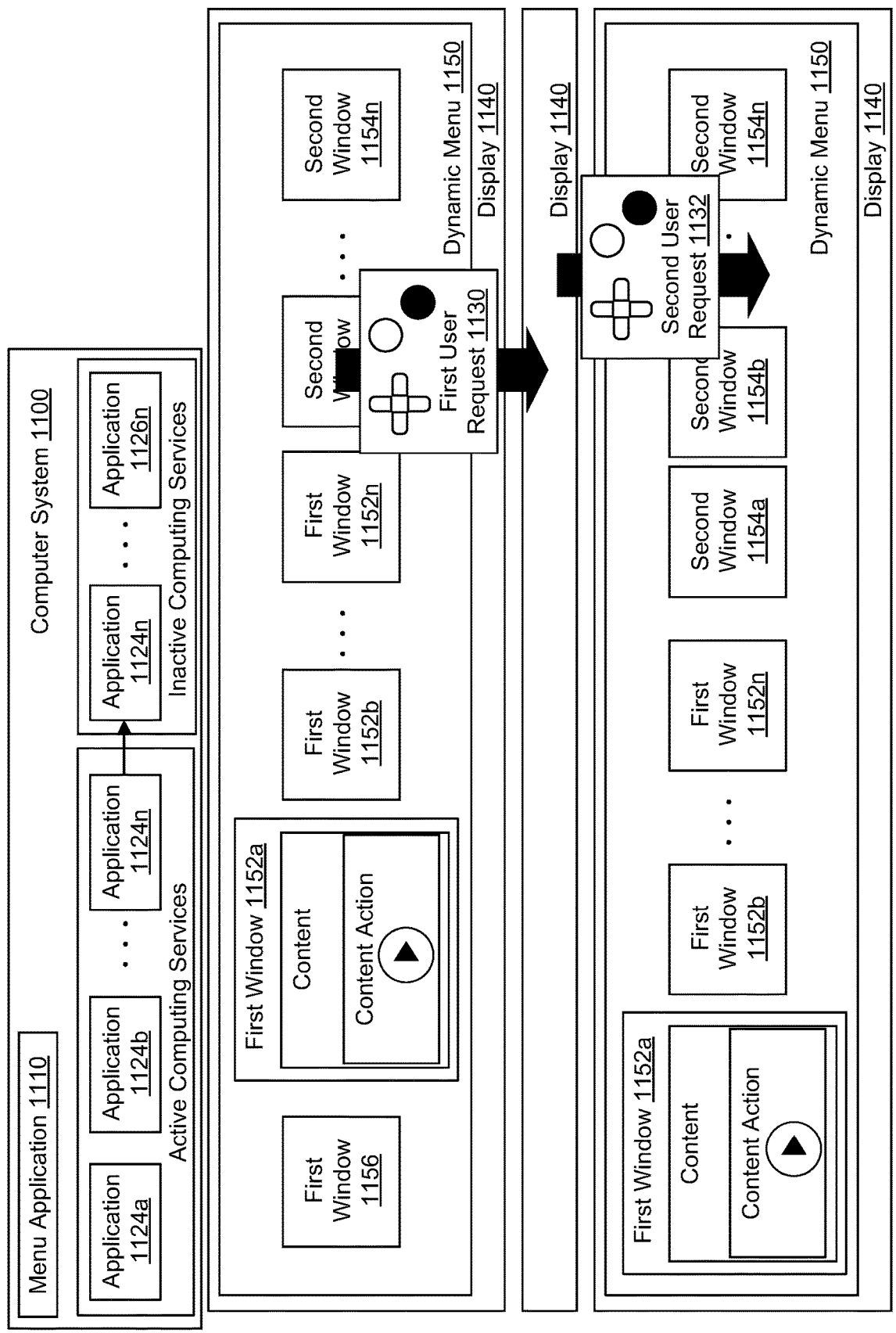
FIG. 11 illustrates an example of a dynamic menu adjusting in response to a deactivated application, according to an embodiment of the present disclosure.

FIG. 11 illustrates an example of a dynamic menu 1150 adjusting in response to a deactivated application 1124*n*, according to an embodiment of the present disclosure. As illustrated in FIG. 11, an active application 1124 running on a computer system 1100 deactivates, as determined by a menu application 1110 running on the computer system 1100, while the computer system 1100 is presenting the dynamic menu 1150 via a display 1140. The deactivated application 1124*n* is different from the menu application 1110. As illustrated in FIG. 11, the dynamic menu presents action cards 1152 for each active application 1124, and actions cards 1154 for inactive applications 1126, as described in more detail in reference to FIG. 5. As described in more detail in reference to FIG. 9, at least one action card is presented in the focused state, while the remaining action cards are shown in the glanced state. As illustrated in FIG. 11, an action card 1152*a* is in the focused state, while a different action card 1156 is associated with the deactivated application 1124*n*. Unlike what was described in reference to FIG. 10, the menu application 1100 does not reorganize and/or adjust the dynamic menu 1140 after determining that the deactivated application 1124*n* is no longer active. Instead, the menu application 1110 continues to present the different action card 1156 in the dynamic menu 1140, until the computer system receives user input 1130, including, but not limited to, a user request to remove the dynamic menu from the display. For example, as described in more detail in reference to FIG. 1, the dynamic menu 1150 may be included in a user interface (e.g., user interface 100 of FIG. 1) presented on the display 1140. In this way, as described in FIG. 9, the user interaction 1130 may prompt the menu application 1110 to remove or minimize the dynamic menu 1150. Upon receiving a second user interaction 1132, for example, by repeating the same command to reverse the change, menu application 1110 repopulates the dynamic menu 1150 without the different action card 1156 and with the same action card 1152*a* in the focused state.

Figure 12:
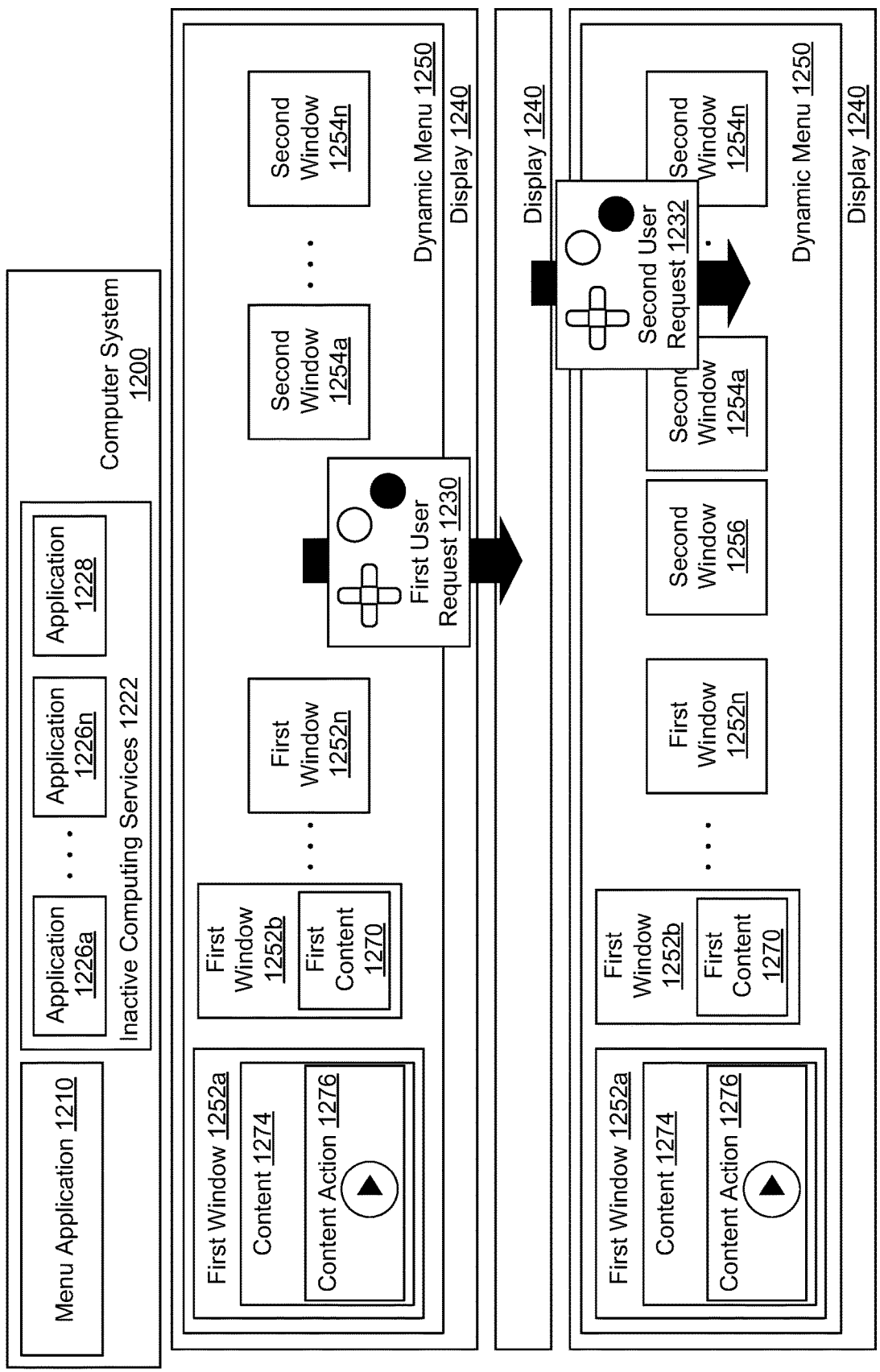
FIG. 12 illustrates an example of a menu application determining an inactive application and adding a corresponding action card to a dynamic menu, according to an embodiment of the present disclosure.

FIG. 12 illustrates an example of a menu application 1210 determining an inactive application 1228 and adding a corresponding action card 1256 to a dynamic menu 1250, according to an embodiment of the present disclosure. As illustrated in FIG. 12, a computer system 1200 runs a menu application 1210 that has determined one or more applications 1226*a-n* are inactive, and has generated and/or presented action cards 1254*a-n* corresponding to the one or more applications 1226 in the dynamic menu 1250 via a display 1240. The action cards 1254 are presented according to a second order (e.g., second order 562 of FIG. 5), as described in more detail in reference to FIG. 5. The inactive application 1228 may have become inactive while the dynamic menu was presented, as described in more detail in reference to FIG. 11. While the dynamic menu 1250 is presented, the menu application 1210 does not adjust the dynamic menu 1250, nor does it populate additional action cards for inactive computing services 1222 for which action cards are not already presented, until the computer system 1200 receives user input 1230 requesting to remove the dynamic menu 1250 from the display 1240. When the computer system 1200 receives a second user input 1232 prompting the menu application 1210 to generate and/or present the dynamic menu 1250, the menu application 1210 populates the dynamic menu 1250 including the corresponding action card 1256 for the inactive application 1228.

Figure 13:
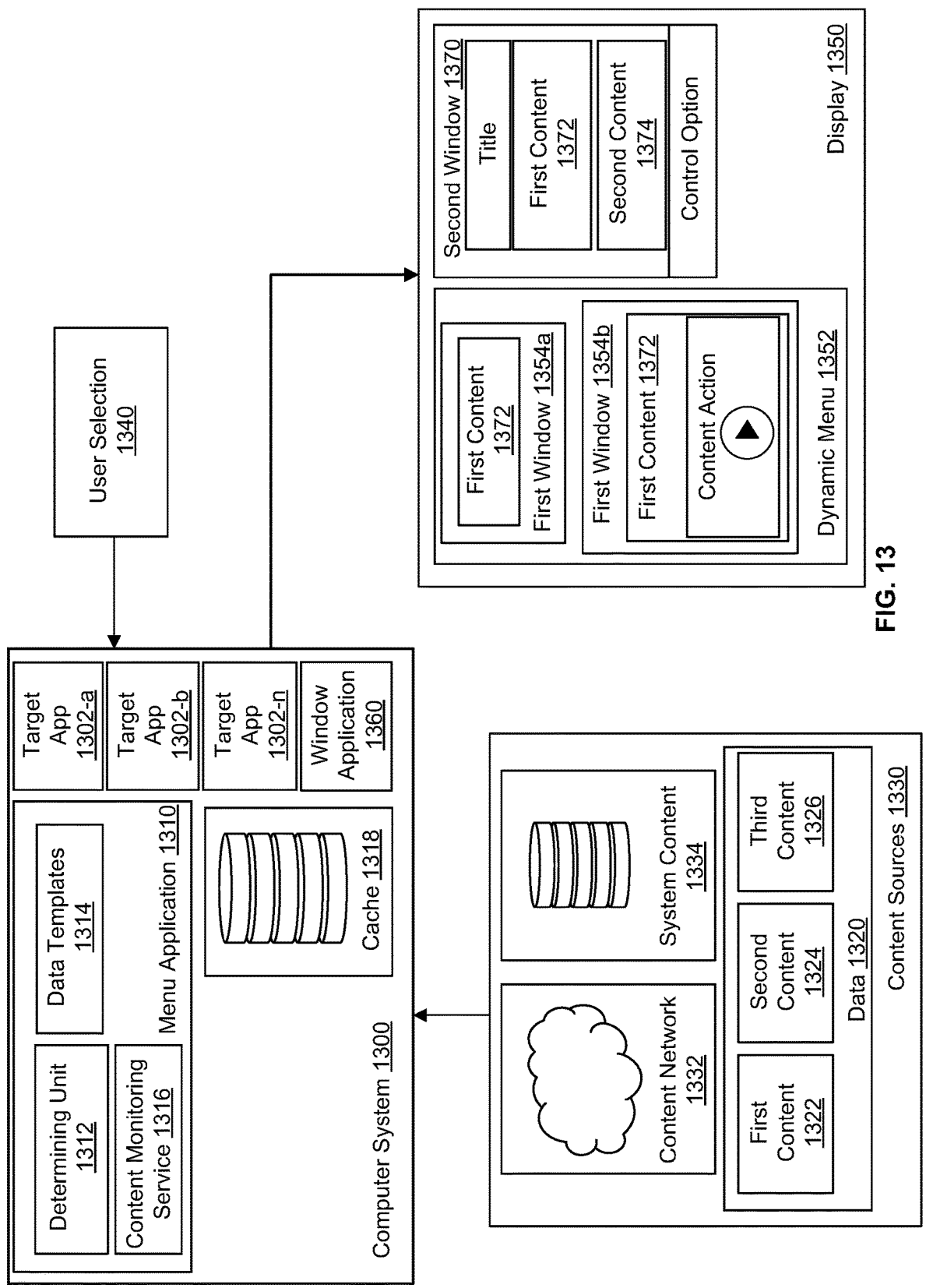
FIG. 13 illustrates an example of a computer system for presentation of content in an interactive menu and an action card, according to an embodiment of the present disclosure.

FIG. 13 illustrates an example of a computer system 1300 for presentation of content in an interactive menu and an action card, according to an embodiment of the present disclosure. As described in more detail in reference to FIGS. 1-2, the computer system 1300 may be a videogame system, a backend system, or any other system configured to store and present content on a display. As illustrated, the computer system 1300 includes multiple target applications 1302*a-n* (hereinafter also referred to as target application 1302, target applications 1302, target app 1302, or target apps 1302, for simplicity), where "a," "b," and "n" are positive integers and "n" refers to the total number of target applications. As illustrated, the computer system 1300 further includes a menu application 1310, a cache 1318, and an action card application 1360. Each of the target apps 1302 may correspond to a different application running on the computer system (e.g., video game console 210 of FIG. 2) or on a backend system, as described in more detail in reference to FIGS. 1-2. The target application 1302 may be a system application or a user application, and is different from the menu application 1310. Generally, a system application is an application that does not interact with a user of the computer system 1300, while a user application is an application configured to interact with a user of the computer system 1300.

The cache 1318 may include a local memory on the computer system (e.g., a hard disk, flash drive, RAM, etc.) configured for rapid storage and retrieval of data to minimize latency. As illustrated, the menu application 1310 includes a determining unit 1312, one or more data templates 1314, and a computing service 1316. The determining unit 1312 may be implemented as software and/or hardware, such that the menu application 1310 may determine a data template 1314 that is defined for a specific target application 1302. The data templates 1314, at least in part, identify the types of content for the computer system 1300 to store in the cache 1318 for the target application 1302 based on the association of a data template 1314 with a target application 1302. In some cases, each data template 1314 further associates a type of content (e.g., audio, video, video game content, etc.) with one or more presentation states.

The menu application may store data 1320 in the cache 1318, where the data 1320 may include multiple types of content including, but not limited to, first content 1322 and second content 1324. For example, as described in more detail in reference to FIGS. 1-2, the content may include video content, audio content, video game content, party chat information, etc. The data 1320 may also include a first uniform resource identifier (URI) of the first content 1322, where a URI typically is characterized by a string of characters identifying a resource following a predefined set of syntactical rules. For example, a URI may identify a resource to facilitate interaction involving that resource between networked systems. Similarly, the data 1320 may include URI information for each type content, for example, a second URI of the second content 1324. The first content 1322 and the second content 1324 may be identified in one or more data templates 1314 and associated in the data templates 1324 with a glanced state, a focused state, and/or a selected state, as described in more detail in reference to FIGS. 1-2. For example, the first content 1322 may be associated with a glanced state and with a focused state, and the second content 1324 may be associated only with the focused state, as defined in a given data template 1314. In this way, the cache 1318 may store multiple types of content associated with multiple data templates 1314, making up data for different target applications 1302.

As illustrated, the computer system 1300 is communicatively coupled with one or more content sources 1330 from which the computer system may fetch and/or receive data 1320. For example, the content sources 1330 may include a content network 1332, including, but not limited to, a cloud-based content storage and/or distribution system. The content sources 1330 may also include system content 1334 provided by a data store communicatively coupled with the computer system (e.g., a hard drive, flash drive, local memory, external drive, optical drive, etc.).

As illustrated, the computer system 1300 is communicatively coupled to an input device 1340, which may include, but is not limited to a user input device as described in more detail in reference to FIG. 2 (e.g. video game controller 220 of FIG. 2). The input device 1340 may provide user input to the computer system 1300 to facilitate user interaction with data 1320 stored in the cache 1318. As described in more detail below, the interaction may take place via one or more menus and/or windows in a UI. For example, the computer system 1300 may generate user interface data to configure a user interface including a static menu and a dynamic menu, as described in more detail in reference to FIG. 1 (e.g., static menu area 140 and dynamic menu area 130 of menu 120 of FIG. 1).

As illustrated, the computer system 1300 is communicatively coupled with display 450. Display 1350 may include any general form of display compatible with interactive user interfaces (e.g., display 230 of FIG. 2). Display 1350 may include an augmented reality and/or virtual reality interface produced by a wearable and/or portable display system, including but not limited to a headset, mobile device, smartphone, etc. In response to input provided by the input device 1340, received as user input by the computer system 1300, the computer system 1300 may present a dynamic menu 1352 via display 1350 (e.g., dynamic menu area 130 of FIG. 1). As described in more detail in reference to FIGS. 1-2, the display 1352 may present a static menu and the dynamic menu 1350, where the dynamic menu 1350 includes one or more action cards 1354. As illustrated, the action cards 1354 are presented in the glanced state, and each may correspond to different target applications 1302, and each may be populated with different data 1320 according to a different data template 1314 associated with the different target applications 1302. For example, the action cards 1356 may include an action card 1354 that corresponds to a first target application 1302, such that the action card 1354 presents first content 1322 based on data from the cache 1318 and according to a data template 1314 defined for the first target application 1302. As described in more detail in reference to FIG. 5, user interaction with the computer system 1300 via the dynamic menu 1350 may switch one or more of the action cards 1354 from the focused state to the glanced state, and vice versa. As illustrated in FIG. 13, action card 1354*b* is in the focused state, but interaction with the dynamic menu 1350 permits a user (e.g., user 506 of FIG. 5) to switch the focused state presentation, for example, from the action card 1354*b* to the action card 1354*a*.

As described in more detail in reference to FIGS. 1-2, the computer system 1300 may receive one or more types of user interaction via the input device 1340 taking the form of a request for the selected state associated with the target application of the action card 1354, as described in more detail in reference to FIG. 4. This may include a user button press on the action card 1354 and/or another form of user interaction via the input device 1340 that constitutes a command option (e.g., command option 440 of FIG. 4). The computer system 1300 may respond to the user input by generating a copy of the data associated with the first target application 1302 from the cache and sending the copy of the data associated with the first target application 1302 to the action card application 1360. As illustrated, the action card application 1360 is different from the menu application and the first target application 1302. The action card application 1360 may be configured to generate user interface data, such that a user interface generated using the user interface data may present, via display 1350, an action card 1370 that corresponds to the first target application 1302 presented in the selected state. The action card 1370, in the selected state, may include both first content 1372 and second content 1374 presented based on the data template 1314 associated with the target application 1302. The first content 1372 and the second content 1374 may be populated in the action card 1370 by the action card application 1360 using the copied data sent to the action card application 1360 by the menu application 1310, in response to user input received by the computer system 1300 via the input device 1340.

Figure 14:
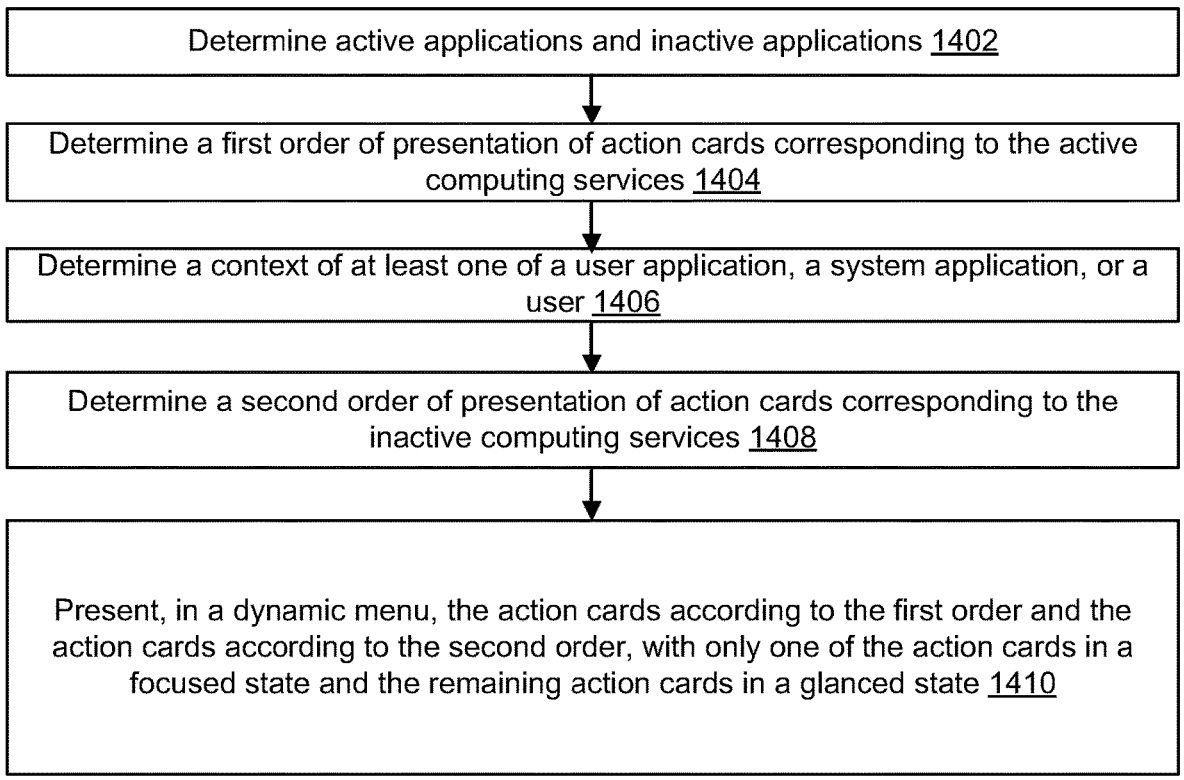
FIG. 14 illustrates an example flow for presenting content in an interactive menu, according to embodiments of the present disclosure.

FIG. 14 illustrates an example flow for presenting content in an interactive menu, according to embodiments of the present disclosure. The operations of the flow can be implemented as hardware circuitry and/or stored as computer-readable instructions on a non-transitory computer-readable medium of a computer system, such as a video game system. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

In an example, the flow includes an operation 1402, where the computer system determines active applications and inactive applications. As described in more detail in reference to FIG. 5, applications on a computer system (e.g., computer system 500 of FIG. 5) may be active or inactive, and the computer system may run a menu application (e.g., menu application 510 of FIG. 5) to determine which applications are active and inactive.

In an example, the flow includes operation 1404, where the computer system determines a first order of presentation of action cards corresponding to the active applications (e.g., active computing services 520 of FIG. 5). As described in more detail in reference to FIG. 5, the menu application determines a first order (e.g., first order 560 of FIG. 5) describing the number, order, and arrangement of action cards (e.g., action cards 552 of FIG. 5) to present in a dynamic menu (e.g., dynamic menu 550 of FIG. 5). The action cards may be associated with the active applications and each may be associated with a different application. As described in more detail in reference to FIG. 5, the first order may be divided into sets, and the action cards may be arranged in order of most recent interaction and/or most frequent interaction. As described in more detail in reference to FIG. 6, the sets may include only action cards for a single application type, and may be limited in the number of action cards in each set, depending on the application type.

In an example, the flow includes operation 1406, where the computer system determines a context of at least one of a user application, a system application, or a user. As described in more detail in reference to FIG. 5, context includes a system application context, a user application context and/or a user context. User context generally includes any of information about the user, an account of the user, active background applications and/or services, and/or applications and/or services available to the user from the computer system or from other network environment (e.g., from a social media platform). User application and/or system application context generally includes any information about the application, specific content shown by the application, and/or a specific state of the application. For instance, the context of a video game player (user context) can include video game applications, music streaming applications, video streaming applications, social media feeds that the video game player has subscribed to and similar contexts of friends of the video game player. The context of a video game application includes the game title, the game level, a current game frame, an available level, an available game tournament, an available new version of the video game application, and/or a sequel of the video game application.

In an example, the flow includes operation 1408, where the computer system determines a second order of presentation of action cards corresponding to the inactive computing services. As described in more detail in reference to FIGS. 5-6, the second order (e.g., second order 562 of FIG. 5) may include multiple action cards (e.g., action cards 554 of FIG. 5) arranged horizontally by relevance to the action cards included in the first order. For example, relevance may be determined by dividing the second order into multiple subsets (e.g., subset 622 of FIG. 6) corresponding, for example, to action cards presenting content for inactive services of active applications (e.g., applications for which an active service is presented in an action card). Alternatively, a subset may be presented including action cards presenting content for inactive services for applications from the same application type as those in the first order. Alternatively, a subset may be presented including action cards presenting content for inactive services of a different application type from those presented in the first order.

In an example, the flow includes operation 1410, where the computer system presents, in a dynamic menu, the action cards according to the first order and the action cards according to the second order, with only one of the action cards in a focused state and the remaining action cards in a glanced state. As described in more detail in reference to FIGS. 5-13, the menu application (e.g., menu application 510 of FIG. 5) may generate and/or present by default a dynamic menu (e.g., dynamic menu 550 of FIG. 5) with a single action card (e.g., action card 554a of FIG. 5) in the focused state, with the remaining action cards in the glanced state. In some embodiments, multiple action cards may be presented in the focused state. As described in more detail in reference to FIG. 7, the focused state may be shifted from one action card to another by user interaction with the computer system. As described in more detail in reference to FIG. 8, an action card may be expanded into the selected state by a different user interaction and/or by repeating the same interaction with the computer system. As described in more detail in reference to FIG. 9, navigating away from the dynamic menu within a user interface may switch all action cards to the glanced state, whereupon the action card having been in the focused state is returned to the focused state when the user returns to the dynamic menu. As described in more detail in reference to FIG. 10 the menu application (e.g., menu application 1010 of FIG. 10) may add additional action cards (e.g., additional action card 1056 of FIG. 10) to the first order (e.g., first order 1060 of FIG. 10) when an application activates (e.g., application 1026a of FIG. 10). As described in more detail in reference to FIG. 11, the menu application may determine that an application has deactivated (e.g., application 1124n of FIG. 11), and may continue to present the corresponding action card (e.g., action card 1156 of FIG. 11) in the dynamic menu until the user interacts with the computer system to remove the dynamic menu from the user interface and/or display. For example, the user may interact with the static menu (e.g., static menu area 140 of FIG. 1) to close the dynamic menu. Upon reopening the dynamic menu, the menu application may remove the action card associated with the deactivated application from the dynamic menu. As described in more detail in reference to FIG. 12, the dynamic menu similarly may add an action card (e.g., action card 1256 of FIG. 12) to the second order only upon reopening the dynamic menu after navigating away and/or closing the dynamic menu by the user.

Figure 15:
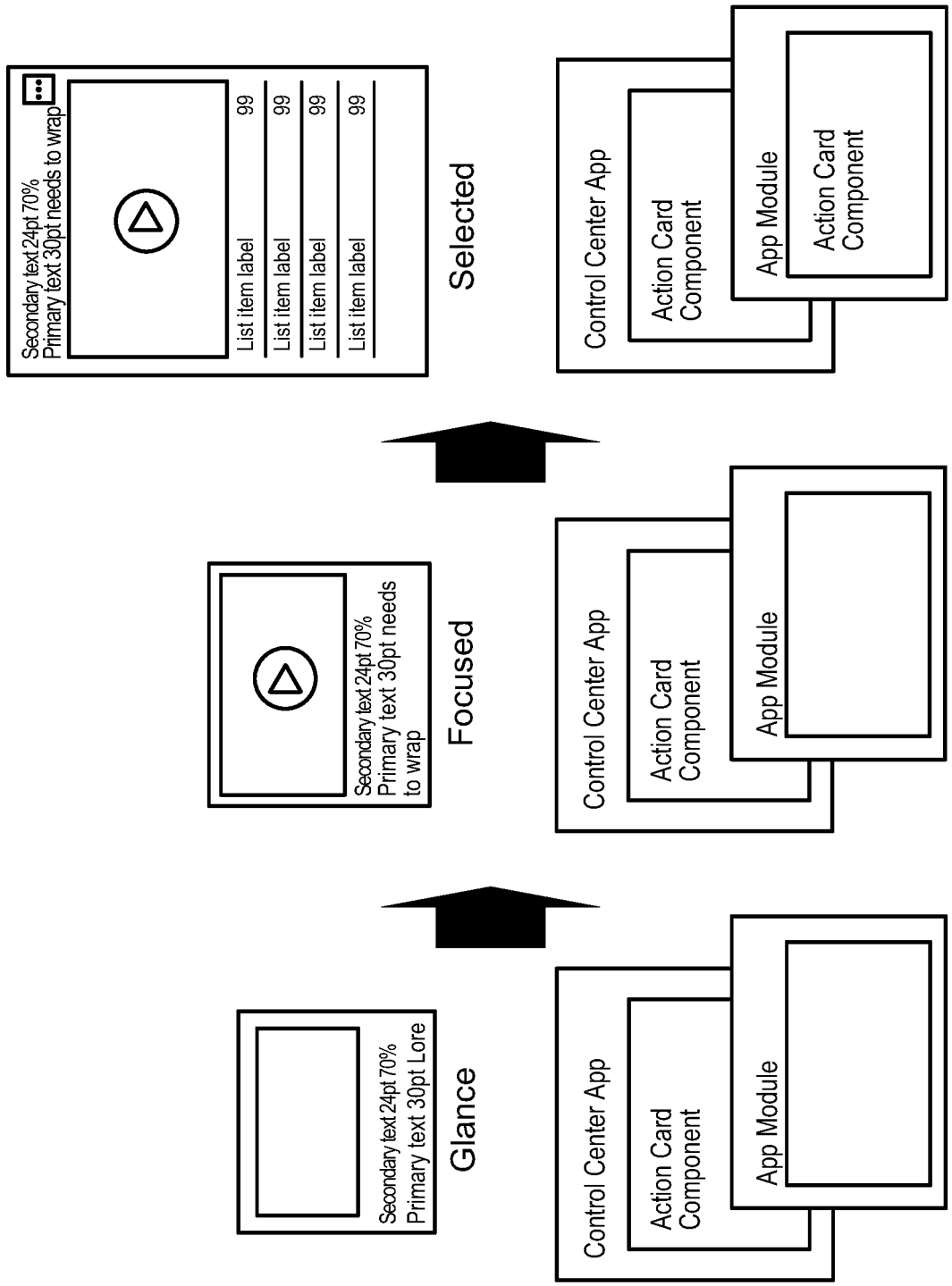
FIG. 15 illustrates an example of launching an application module and terminating a menu application, according to embodiments of the present disclosure.
Figure 16:
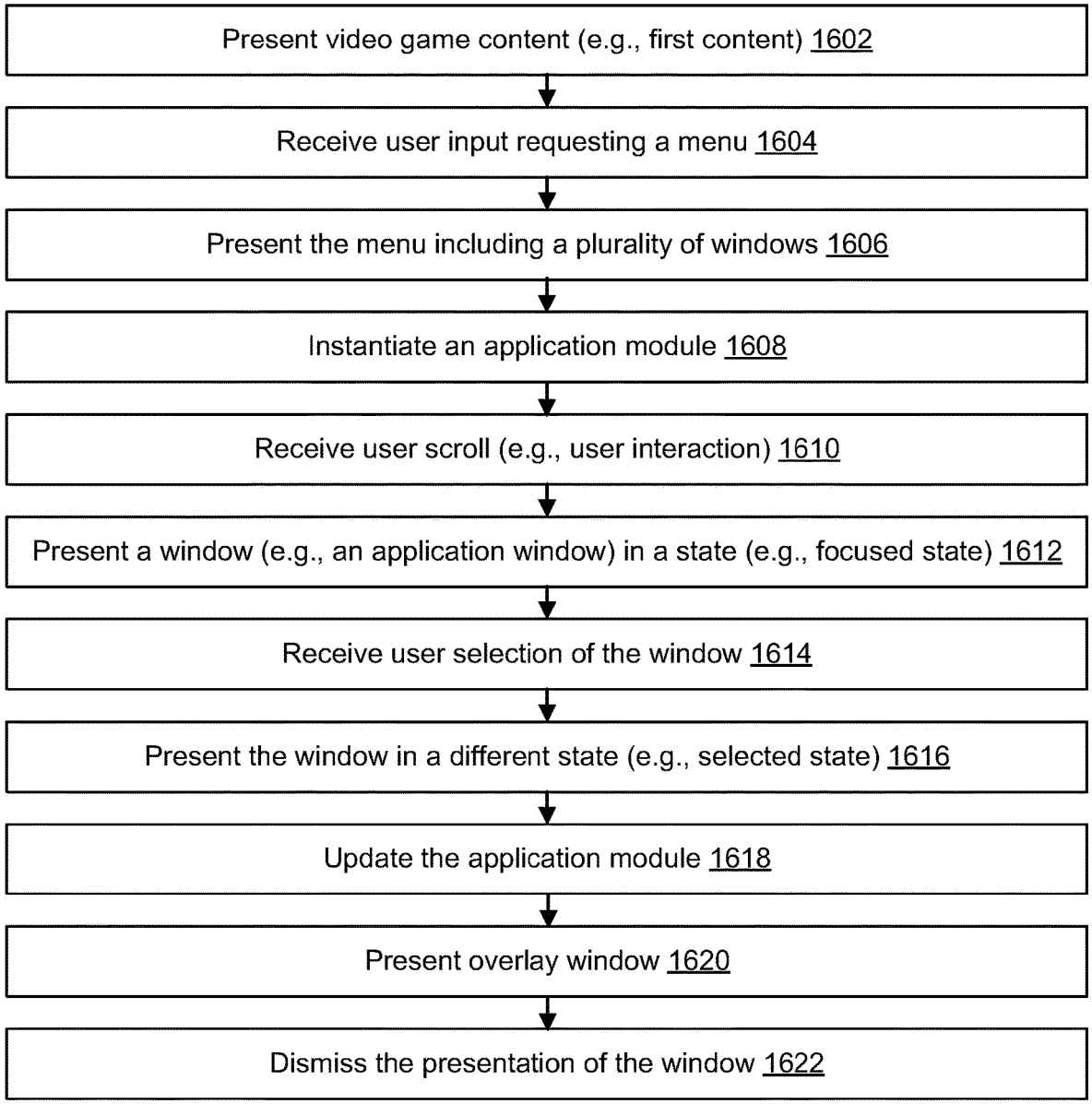
FIG. 16 illustrates an example flow for launching an application module and terminating a menu application, according to embodiments of the present disclosure.
Figure 17:
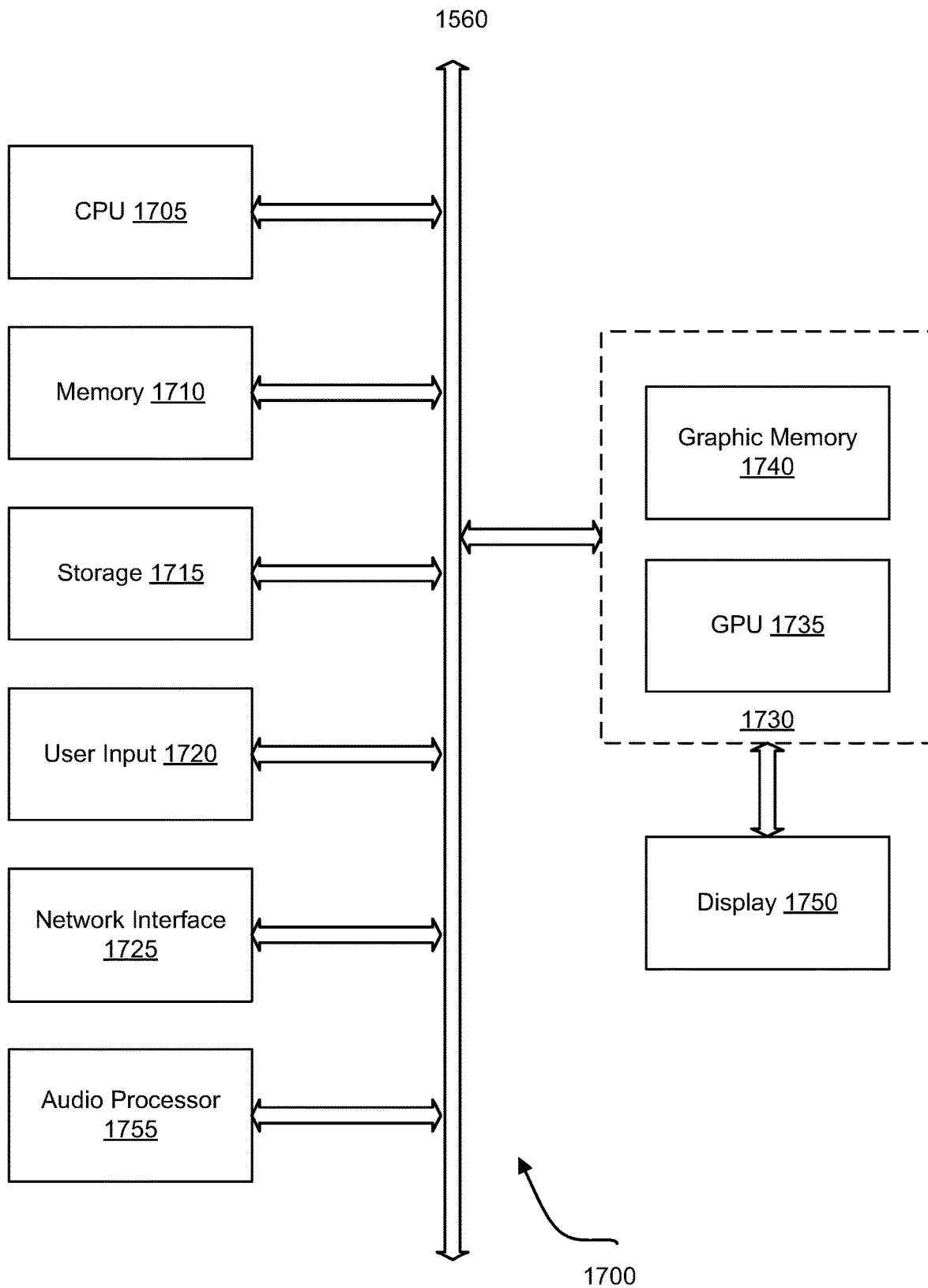
FIG. 17 illustrates an example of a hardware system suitable for implementing a computer system, according to embodiments of the present disclosure.

FIG. 15 illustrates an example of launching an application module and terminating a menu application, according to embodiments of the present disclosure. In particular, the menu application is used to present a menu that includes a plurality of windows. As illustrated, a menu application 1510 supports the presentation of a window 1520 in a glanced state 1522, a focused state 1524, and a selected state 1526 depending on user input from an input device as explained herein above. The window 1520 corresponds to an application (referred to herein as an "underlying application" in the interest of clarity). Metadata of the underlying application may be received by the menu application to populate, by the menu application 1510, the content and selectable actions on the content in the window 1520 as relevant to each state (the content and selectable actions are shown as "action card component 1512").

In an example, when the window 1520 is added (along with other windows corresponding to different underlying applications) to the menu, the menu application 1510 also instantiates an application module 1530. The application module 1530 can be a logical container for coordinated objects related to a task (e.g., to present an interfacing window) with optional programming window. The application module 1530 can have parameters common to the different underlying applications (e.g., common objects), whereby it represents a shell from which any of these applications can be quickly launched. When the window 1510 is in the glanced state 1522 or the focused state 1524, the menu application 1510 does not pass content or application-related information to the application module 1530 (this is illustrated in FIG. 15 with blank area of the application module 1530).

When the window 1520 starts transitioning from the focused state 1524 to the selected state 1526 in response to a user selection of the window 1520, the size, content, and selectable actions of the window 1520 start changing. The menu application passes information about this change along with parameters specific of the underlying application (that corresponds to the window 1520) to the application module 1530 (e.g., state information, programming logic, etc.). Accordingly, the application module 1530 would have the same action card component 1532 as the action card component 1512 presented in the window 1520 during the transition to and in the selected state 1526. In addition, the application module 1530 corresponds to an instantiation of the underlying application given the specific parameters of this application.

During the transition and in the selected state 1426, the application module 1430 supports an overlay window 1440 that has the same size and includes the same content and actions as the window 1420. A rendering process presents the overlay window 1440 over the window 1420, such that both windows completely overlap during the transition and in the selected state 1426. Hence, from a user perspective, the user would only perceive one window (e.g., the overlay window 1440), while in fact two windows are presented on top of each other.

Upon the end of the transition or upon user input requesting action, the window 1420 may be dismissed (e.g., closed) and the overlay window 1440 may be used instead. From that point, the overlay window 1440 becomes the interface to the underlying application and the menu application 1410 can be terminated (or run in the background).

FIG. 12 illustrates an example flow for launching an application module and terminating a menu application, according to embodiments of the present disclosure. The operations of the flow can be implemented as hardware circuitry and/or stored as computer-readable instructions on a non-transitory computer-readable medium of a computer system, such as a video game system. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered. The example flow in FIG. 12 can be performed in conjunction with or separately from the example flow in FIG. 10.

In an example, the flow includes an operation 1202, where the computer system presents video content of a video game application (e.g., first content of a first application) on a display. The video game application can be executed on the computer system and the video game content can be presented based on the game play of a user of the computer system (e.g., a video game player).

In an example, the flow includes an operation 1204, where the computer system receives user input requesting a menu. For instance, the user input is received from an input device (e.g., a video game controller) and corresponds to a user push of a key or button on the input device (e.g., a particular video game controller button) or any other type of input (e.g., a mouse click). An event may be generated from the user input indicating a command. The command can be for the presentation of the menu. Otherwise, the command can be for other controls (e.g., the display of a home user interface, an exit from the video game application, etc.) depending on the type of the user input.

In an example, the flow includes an operation 1206, where the computer system presents the menu, where this menu includes a plurality of windows (e.g., action cards) displayed in a dynamic area of the menu and a plurality of icons displayed in a static area of the menu. For instance, the menu is presented in response to the command for the presentation of the menu. In addition, a user context and an application context can be determined and used to select particular application or remote computing services that are likely of interest to the user. Each window within the dynamic menu area corresponds to one of these applications. The windows can also be presented in a glanced state. In one illustration, the window of likely most interest to the user given the user context and application context can be shown in another state (e.g., the focused state). In another illustration, if one of the windows was selected or was in a focused state upon the most previous dismissal of the menu, that window can be presented in the focused state.

In an example, the flow includes an operation 1208, where the computer system instantiates an application module. The application module can have parameters common to the different applications that correspond to the windows of the menu.

In an example, the flow includes an operation 1210, where the computer system receives a user scroll through the windows within the dynamic menu area (or any other types of interactions within the dynamic menu area indicating a focus of the user). The user scroll can be received based on user input from the input device and a relevant event can be generated based on this input.

In an example, the flow includes an operation 1212, where the computer system presents a window (e.g., an application window corresponding to one of the applications where the user focus is currently on) in the other state (e.g. the focused state). For instance, if the user scroll is over the window, that window is presented in the focused state, while the presentation of the remaining windows is in the glanced state.

In an example, the flow includes an operation 1214, where the computer system receives a user selection of the window. The user selection can be received based on user input from the input device and while the window is presented in the focused state. A relevant event can be generated based on this input.

In an example, the flow includes an operation 1216, where the computer system presents the window in a different state (e.g. a selected state). For instance, the window's size is changed from the focused state to the selected state, while the presentation of the remaining windows remains in the glanced state.

In an example, the flow includes an operation 1218, where the computer system updates the application module to include parameters specific to the corresponding application of the selected window and to present an overlay window. For instance, the size, content, and actions of the window and the state information and programming logic of the application are passed to the application window, thereby launching an instance of the application from the application module, where this instance can use the information about the size, content, and actions of the window for the presentation of the overlay window.

In an example, the flow includes an operation 1220, where the computer system presents the overlay window. For instance, as the window transitions from the focused state to the selected state or once in the selected state, a rendering process also presents the overlay window over the window.

In an example, the flow includes an operation 1222, where the computer system dismisses the presentation of the window. For instance, upon the presentation of the overlay window or upon the transition to the selected state, the window is closed. In addition, the menu application can be termination or can be moved to the background.

In an example, the flow includes an operation 1224, where the computer system presents an option to perform an action (e.g., a selectable action) on the overlay window (e.g., to pin to side or to show as a picture in picture). For instance, the option is presented as an icon within the overlay window upon the transition to the selected state.

In an example, the flow includes an operation 1226, where the computer system receives a user selection of the option. The user selection can be received based on user input from the input device and a relevant event can be generated based on this input.

In an example, the flow includes an operation 1228, where the computer system performs the action. For instance, a pin-to-side operation or a picture-in-picture operation are performed on the overlay window, resulting in a pinned window or a picture-in-picture window.

In an example, the flow includes an operation 1230, where the computer system changes user control from the menu to the video game content. For instance, the presentation of the menu is dismissed, while the presentation of the content continues in the pinned window or the picture-in-picture window. User input received subsequently can be used to control the video game application or to request the menu again. In an illustration, a subset of the buttons, keys, or gestures on the input device are mapped to and usable for controlling the video game application, while another subset of the buttons, keys, or gestures are mapped to and usable for controlling the pinned window or picture-in-picture window. In this way, the user can have simultaneous control over both the video game application and the other application (that interfaces with the user through the pinned window or picture-in-picture window) depending on the buttons on the input device.

FIG. 13 illustrates an example of a hardware system suitable for implementing a computer system, according to embodiments of the present disclosure. The computer system 1300 represents, for example, a video game system, a backend set of servers, or other types of a computer system. The computer system 1300 includes a central processing unit (CPU) 1305 for running software applications and optionally an operating system. The CPU 1305 may be made up of one or more homogeneous or heterogeneous processing cores. Memory 1310 stores applications and data for use by the CPU 1305. Storage 1315 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1320 communicate user inputs from one or more users to the computer system 1300, examples of which may include keyboards, mice, joysticks, touch pads, touch screens, still or video cameras, and/or microphones. Network interface 1325 allows the computer system 1300 to communicate with other computer systems via an electronic communications network, and may include wired or wireless communication over local area networks and wide area networks such as the Internet. An audio processor 1355 is adapted to generate analog or digital audio output from instructions and/or data provided by the CPU 1305, memory 1310, and/or storage 1315. The components of computer system 1300, including the CPU 1305, memory 1310, data storage 1315, user input devices 1320, network interface 1325, and audio processor 1355 are connected via one or more data buses 1360.

A graphics subsystem 1330 is further connected with the data bus 1360 and the components of the computer system 1300. The graphics subsystem 1330 includes a graphics processing unit (GPU) 1335 and graphics memory 1340. The graphics memory 1340 includes a display memory (e.g., a frame buffer) used for storing pixel data for each pixel of an output image. The graphics memory 1340 can be integrated in the same device as the GPU 1335, connected as a separate device with the GPU 1335, and/or implemented within the memory 1310. Pixel data can be provided to the graphics memory 1340 directly from the CPU 1305. Alternatively, the CPU 1305 provides the GPU 1335 with data and/or instructions defining the desired output images, from which the GPU 1335 generates the pixel data of one or more output images. The data and/or instructions defining the desired output images can be stored in the memory 1310 and/or graphics memory 1340. In an embodiment, the GPU 1335 includes 3D rendering capabilities for generating pixel data for output images from instructions and data defining the geometry, lighting, shading, texturing, motion, and/or camera parameters for a scene. The GPU 1335 can further include one or more programmable execution units capable of executing shader programs.

The graphics subsystem 1330 periodically outputs pixel data for an image from the graphics memory 1340 to be displayed on the display device 1350. The display device 1350 can be any device capable of displaying visual information in response to a signal from the computer system 1300, including CRT, LCD, plasma, and OLED displays. The computer system 1300 can provide the display device 1350 with an analog or digital signal.

In accordance with various embodiments, the CPU 1305 is one or more general-purpose microprocessors having one or more processing cores. Further embodiments can be implemented using one or more CPUs 1305 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 76%, 135%, 90%, 100%, 105%, 109%, 109.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for presenting a dynamic menu for different applications of a computer system, the method implemented by the computer system, the method comprising:

determining, by a menu application, active computing services and inactive computing services available from the different applications;

determining, by the menu application, a first order of presentation of first windows within the dynamic menu, each of the first windows corresponding to one of the active computing services, the first order indicating an arrangement of the first windows based on at least one of: (i) timing of activating the active computing services, or (ii) timing of interacting with the active computing services;

determining, by the menu application, a context of at least one of: a user application of the computer system, a system application of the computer system, or a user of the computer system;

determining, by the menu application and based on the context, a second order of presentation of second windows within the dynamic menu, each of the second windows corresponding to one of the inactive computing services, the second order predefined for the context and different from the first order, indicating an arrangement of the second windows according to application types, and being different from another order predefined for another context; and presenting, by the menu application, the first windows within the dynamic menu according to the first order and the second windows within the dynamic menu according to the second order, one or more of the first windows and one or more of the second windows presented in a first presentation state, and one of the first windows or one of the second windows presented in a second presentation state, the second presentation state presenting more information relative to the first presentation state.

2. The method of claim 1, wherein the first windows and the second windows are presented in a carousel arrangement within the dynamic menu, wherein a first window of the first windows is presented adjacent to a second window of the second windows, and wherein the first window and the second window are presented in the first presentation state.

3. The method of claim 1, further comprising:

prior to presenting the first windows and the second windows, receiving a user request for the dynamic menu; and presenting, by the menu application, the dynamic menu in response to the user request, wherein only a first window of the first windows is presented in the second presentation state within the dynamic menu, and wherein remaining windows are presented in the first presentation state within the dynamic menu.

4. The method of claim 3, further comprising:

after receiving the user request, receiving a user interaction with the dynamic menu; and presenting, by the menu application in response to the user interaction, the first window in the first presentation state and another window of the remaining windows in the second presentation state.

5. The method of claim 3, further comprising:

after presenting the first window in the second presentation state, receiving a user interaction with the first window, the first window corresponding to a first application of the different applications; and presenting, by a window application in response to the user interaction, a second window in an overlay over the first window, the second window presented in a third presentation state within and comprising a selectable action that controls content of the first application, the window application being different from the menu application and the first application.

6. The method of claim 1, wherein a first window of the first windows is presented in the second presentation state within the dynamic menu, and the method further comprising:

receiving a first user request to navigate away of the dynamic menu;

presenting, by the menu application in response to the first user request, the first windows and the second windows in the first presentation state;

receiving a second user request for the dynamic menu; and presenting, by the menu application in response to the first user request, the first window in the second presentation state within the dynamic menu and remaining ones of the first windows and the second windows in the first presentation state within the dynamic menu.

7. The method of claim 1, wherein the dynamic menu is presented within a user interface on a display, and the method further comprising:

detecting a change to the context; and removing the dynamic menu the user interface in response to the detection of the change.

8. The method of claim 1, wherein the first order indicates that the first windows are to be organized in sets of windows, wherein each set corresponds to an application type, and wherein the first order further indicates a maximum set size per application type.

9. The method of claim 1, further comprising:

determining, by the menu application while the dynamic menu is presented, that an inactive computing service has been activated; and presenting, by the menu application, an additional window within the dynamic menu in the first presentation state, the additional window corresponding to the inactive computing service that has been activated and presented according to the first order.

10. The method of claim 1, wherein the dynamic menu is presented within a user interface on a display, and the method further comprising:

determining, by the menu application while the dynamic menu is presented, that an active computing service has been deactivated, the dynamic menu comprising a first window corresponding to the active computing service;

continuing, by the menu application and after the active computing service has been deactivated, to present the first window within the dynamic menu;

receiving, a first user request to remove the dynamic menu from the user interface;

removing, by the menu application in response to the first user request, the dynamic menu from the user interface;

receiving, a second user request for the dynamic menu; and presenting, by the menu application in response to the second user request, the dynamic menu within the user interface, the dynamic menu no longer including the first window.

11. The method of claim 1, wherein the dynamic menu is presented within a user interface on a display, and the method further comprising:

determining, by the menu application while the dynamic menu is presented, that a second window is not presented within the dynamic menu and corresponds to an inactive computing service;

continuing, by the menu application, to exclude the second window from the presentation of the dynamic menu;

receiving, a first user request to remove the dynamic menu from the user interface;

removing, by the menu application in response to the first user request, the dynamic menu from the user interface;

receiving, a second user request for the dynamic menu; and presenting, by the menu application in response to the second user request, the dynamic menu within the user interface, the dynamic menu including the second window.

12. The method of claim 1, wherein the context comprises at least one of:

an identifier of a user account, an identifier of a user application, a type of the user application, an operational state of the user application, an indication of whether content of the user application is presented in a foreground or a background of a user interface, or an indication of whether the user application is resumed by a system application.

13. The method of claim 1, wherein the context indicates at least one of: a video game application is presenting video game content in a foreground of a user interface, a media application is presenting media content in the foreground, a system application resumed with the video game application, the system application resumed with the media application, or functionalities of the system application are presented in the foreground.

14. The method of claim 1, wherein the context indicates that a video game application is presenting video game content in a foreground of a user interface, and wherein the second order indicates that the second windows are to be arranged in a sequence having a descending order of relevance, wherein a first subset of the second windows are arranged first in the sequence based on corresponding to inactive computing services of the video game application, wherein a second subset of the second windows are arranged second in the sequence based on corresponding to inactive computing services of other video game applications, wherein a third subset of the second windows are arranged third in the sequence based on corresponding to inactive computing services of non-video game applications.

15. The method of claim 1, wherein the second order indicates that the second windows are to be organized in sets of windows, wherein each set corresponds to a different one of the application types, and wherein the second order further indicates a maximum set size per application type.

16. A computer system comprising:

one or more processors; and one or more memories storing computer-readable instructions that, upon execution by the one or more processors, configure the computer system to:

determine, by a menu application, active computing services and inactive computing services available from different applications of the computer system;

determine, by the menu application, a first order of presentation of first windows within a dynamic menu, each of the first windows corresponding to one of the active computing services, the first order indicating an arrangement of the first windows based on at least one of:

(i) timing of activating the active computing services, or (ii) timing of interacting with the active computing services;

determine, by the menu application, a context of at least one of: a user application of the computer system, a system application of the computer system, or a user of the computer system;

determine, by the menu application and based on the context, a second order of presentation of second windows within the dynamic menu, each of the second windows corresponding to one of the inactive computing services, the second order predefined for the context and different from the first order, indicating an arrangement of the second windows according to application types, and being different from another order predefined for another context; and present, by the menu application, the first windows within the dynamic menu according to the first order and the second windows within the dynamic menu according to the second order, one or more of the first windows and one or more of the second windows presented in a first presentation state, and one of the first windows or one of the second windows presented in a second presentation state, the second presentation state presenting more information relative to the first presentation state.

17. One or more non-transitory computer-readable media storing computer-readable instructions that, upon execution on a computer system, cause the computer system to perform operations comprising:
    determining, by a menu application, active computing services and inactive computing services available from different applications of the computer system
    determining, by the menu application, a first order of presentation of first windows within a dynamic menu, each of the first windows corresponding to one of the active computing services, the first order indicating an arrangement of the first windows based on at least one of: (i) timing of activating the active computing services, or (ii) timing of interacting with the active computing services;
    determining, by the menu application, a context of at least one of: a user application of the computer system, a system application of the computer system, or a user of the computer system;
    determining, by the menu application and based on the context, a second order of presentation of second windows within the dynamic menu, each of the second windows corresponding to one of the inactive computing services, the second order predefined for the context and different from the first order, indicating an arrangement of the second windows according to application types, and being different from another order predefined for another context; and
    presenting, by the menu application, the first windows within the dynamic menu according to the first order and the second windows within the dynamic menu according to the second order, one or more of the first windows and one or more of the second windows presented in a first presentation state, and one of the first windows or one of the second windows presented in a second presentation state, the second presentation state presenting more information relative to the first presentation state.

18. The one or more non-transitory computer-readable media of claim 17, wherein the operations further comprise:
    determining, by the menu application, a data template that (i) is defined for a first application of the different applications, (ii) identifies types of content of the first application to be cached, and (iii) associates each type with one or more presentation states;
    storing, by the menu application and based on the data template, data of the first application in a cache of the menu application, the data comprising first content or a first uniform resource identifier (URI) of the first content, the first content being of a first type identified in the data template and associated in the data template with the first presentation state and with the second presentation state; and
    presenting, by the menu application, a first window within the dynamic menu in the first presentation state, the first window corresponding to the first application and comprising the first content.

19. The one or more non-transitory computer-readable media of claim 18, wherein the data further comprising second content or a second URI of the second content, the second content being of a second type identified in the data template and associated in the data template with the second presentation state, and wherein the operations further comprise:
    receiving, a user interaction with the dynamic menu; and
    presenting, by the menu application in response to the user interaction, the first window within the dynamic menu in the second presentation state, the first window further comprising the second content based on the data template.

20. The one or more non-transitory computer-readable media of claim 19, wherein the data further comprising third content or a third URI of the third content, the third content being of a third type identified in the data template and associated in the data template with a third presentation state, and wherein the operations further comprise:
    receiving, a user selection of the first window while the first window is presented in the second presentation state;
    generating, by the menu application in response to the user selection, a copy of the data from the cache;
    sending, by the menu application, the copy to a window application; and
    presenting, by the window application, a second window in the third presentation state and comprising the third content based on the data template.

21. A computer-implemented method for presenting a dynamic menu for different applications of a computer system, the method comprising:
    determining, by a menu application, active computing services and inactive computing services available from the different applications;
    determining, by the menu application, a first order of presentation of first windows within the dynamic menu, each of the first windows corresponding to one of the active computing services;
    determining a second order of presentation of second windows within the dynamic menu, each of the second windows corresponding to one of the inactive computing services; and
    presenting, by the menu application, the first windows within the dynamic menu according to the first order and the second windows within the dynamic menu according to the second order, wherein the first windows and the second windows are presented sequentially next to each other along a horizontal line or a vertical line.

22. A computer-implemented method for presenting a dynamic menu for different applications of a computer system, the method comprising:
    determining, by a menu application of the computer system, active computing services and inactive computing services available from the different applications;
    determining, by the menu application of the computer system, active windows for presentation within the dynamic menu, each of the active windows corresponding to an active computing service of the active computing services;
    determining, by the menu application of the computer system, suggested windows for presentation within the dynamic menu, each of the suggested windows corresponding to an inactive computing service of the inactive computing services, wherein:

each inactive computing service has not been previously used by a user of the computer system, and each suggested window is determined based on a context of at least the user or any one of the active computing services or the inactive computing services; and presenting, by the menu application, the active windows and the suggested windows within the dynamic menu, wherein the active windows and the suggested windows are presented sequentially next to each other along a horizontal line or a vertical line.

\* \* \* \* \*